US012614403B2

(12) United States Patent     (10) Patent No.:   US 12,614,403 B2

Hu et al.     (45) Date of Patent:    Apr. 28, 2026

(54) AUTOMATED GENERATION OF TRAINING DATA COMPRISING DOCUMENT IMAGES AND ASSOCIATED LABEL DATA

(71) Applicant: Oracle International Corporation, Redwood Shores, CA (US)

(72) Inventors: Yazhe Hu, Austin, TX (US); Yuying Wang, Seattle, WA (US); Liyu Gong, Austin, TX (US); Iman Zadeh, Los Angeles, CA (US); Jun Qian, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 451 days.

(21) Appl. No.: 17/692,844

(22) Filed: Mar. 11, 2022

(65) Prior Publication Data

US 2023/0316792 A1     Oct. 5, 2023

(51) Int. Cl.
   *G06V 30/19*     (2022.01)
   *G06N 20/00*     (2019.01)

(52) U.S. Cl.
   CPC ....... *G06V 30/19147* (2022.01); *G06N 20/00* (2019.01); *G06V 30/1916* (2022.01)

(58) Field of Classification Search
   CPC ......... G06V 30/19147; G06V 30/1916; G06N 20/00
   See application file for complete search history.

(56) References Cited

U.S. PATENT DOCUMENTS

| | | | | |
|---|---|---|---|---|
| 9,501,724 | B1 * | 11/2016 | Yang | G06T 3/40 |
| 9,798,612 | B1 * | 10/2017 | Foerster | G06T 5/60 |
| 10,095,957 | B2 * | 10/2018 | Kulkarni | G06V 10/762 |
| 10,262,235 | B1 * | 4/2019 | Chen | G06N 3/0442 |
| 10,262,236 | B2 * | 4/2019 | Lim | G06F 18/28 |
| 10,318,846 | B2 * | 6/2019 | Brown | G06F 18/41 |
| 10,339,443 | B1 * | 7/2019 | Medioni | G06T 15/80 |
| 10,643,066 | B2 * | 5/2020 | Zhang | G06N 3/04 |

(Continued)

OTHER PUBLICATIONS

"Overview—ICDAR 2019 Robust Reading Challenge on Scanned Receipts OCR and Information Extraction", Robust Reading Competition, Available Online at: https://rrc.cvc.uab.es/?ch=13, 2019, 3 pages.

(Continued)

*Primary Examiner* — Mohammed H Zuberi

(74) *Attorney, Agent, or Firm* — Kilpatrick Townsend & Stockton LLP

(57)       ABSTRACT

Techniques are described for automatically, and substantially without human intervention, generating training data where the training data includes a set of training images containing text content and associated label data. Both the training images and the associated label data are automatically generated. The label data that is automatically generated for a training image includes one or more labels identifying locations of one or more text portions within the training image, and for each text portion, a label indicative of the text content in the text portion. By automating both the generation of training images and the generation of associated label data, the techniques described herein are very scalable and repeatable and can be used to generate large amounts of training data, which in turn enables building more reliable and accurate language models.

20 Claims, 19 Drawing Sheets

(56) References Cited

U.S. PATENT DOCUMENTS

| | | | |
|---|---|---|---|
| 10,783,400 B2 * | 9/2020 | Kriegman | G06V 30/40 |
| 11,521,372 B2 * | 12/2022 | Tanniru | G06V 30/19173 |
| 2015/0269431 A1 * | 9/2015 | Haji | G06V 40/30 |
| | | | 382/186 |
| 2018/0114097 A1 * | 4/2018 | Wang | G06N 3/045 |
| 2019/0295289 A1 * | 9/2019 | Khan | G06V 10/82 |
| 2021/0110205 A1 * | 4/2021 | Karimi | G06V 30/32 |
| 2021/0295114 A1 * | 9/2021 | Ye | G06F 18/253 |
| 2022/0301328 A1 * | 9/2022 | Li | G06V 30/153 |
| 2024/0119743 A1 * | 4/2024 | Xue | G06V 30/19093 |

OTHER PUBLICATIONS

Christodoulopoulos et al., "Bible-Corpus", Github, Available Online at: https://github.com/christos-c/bible-corpus, Jun. 11, 2020, 2 pages.

Du et al., "PP-OCR: A Practical Ultra Lightweight OCR System", arXiv:2009.09941, Available Online at: https://arxiv.org/abs/2009.09941, 2020, 14 pages.

Fogel et al., "ScrabbleGAN: Semi-Supervised Varying Length Handwritten Text Generation", Available Online at: https://assets.amazon.science/18/27/8494bcc240c4953d9a27f9b43b22/scipub-1310.pdf, 2020, 12 pages.

Gupta et al., "Synthetic Data for Text Localisation in Natural Images", IEEE Conference on Computer Vision and Pattern Recognition (CVPR), 2016, 14 pages.

Koehn , "Europarl: A Parallel Corpus for Statistical Machine Translation", Available Online at: https://www.statmt.org/europarl/, 2005, 8 pages.

Koehn , "Europarl: A Parallel Corpus for Statistical Machine Translation", Available Online at: https://www.statmt.org/europarl/, 2005, 4 pages.

* cited by examiner

SELECT A FIRST TRANSFORMATION PROCESS ACCORDING TO A WEIGHT ASSOCIATED WITH EACH OF MULTIPLE TRANSFORMATION PROCESSES ⟋ 902

IDENTIFY EACH OF A SERIES OF TRANSFORMATION STEPS TO BE PERFORMED BASED ON WEIGHTS ASSIGNED TO EACH OF THE SERIES OF TRANSFORMATION STEPS ⟋ 904

MODIFY AN IMAGE ACCORDING TO EACH OF THE IDENTIFIED TRANSFORMATION STEPS ⟋ 906

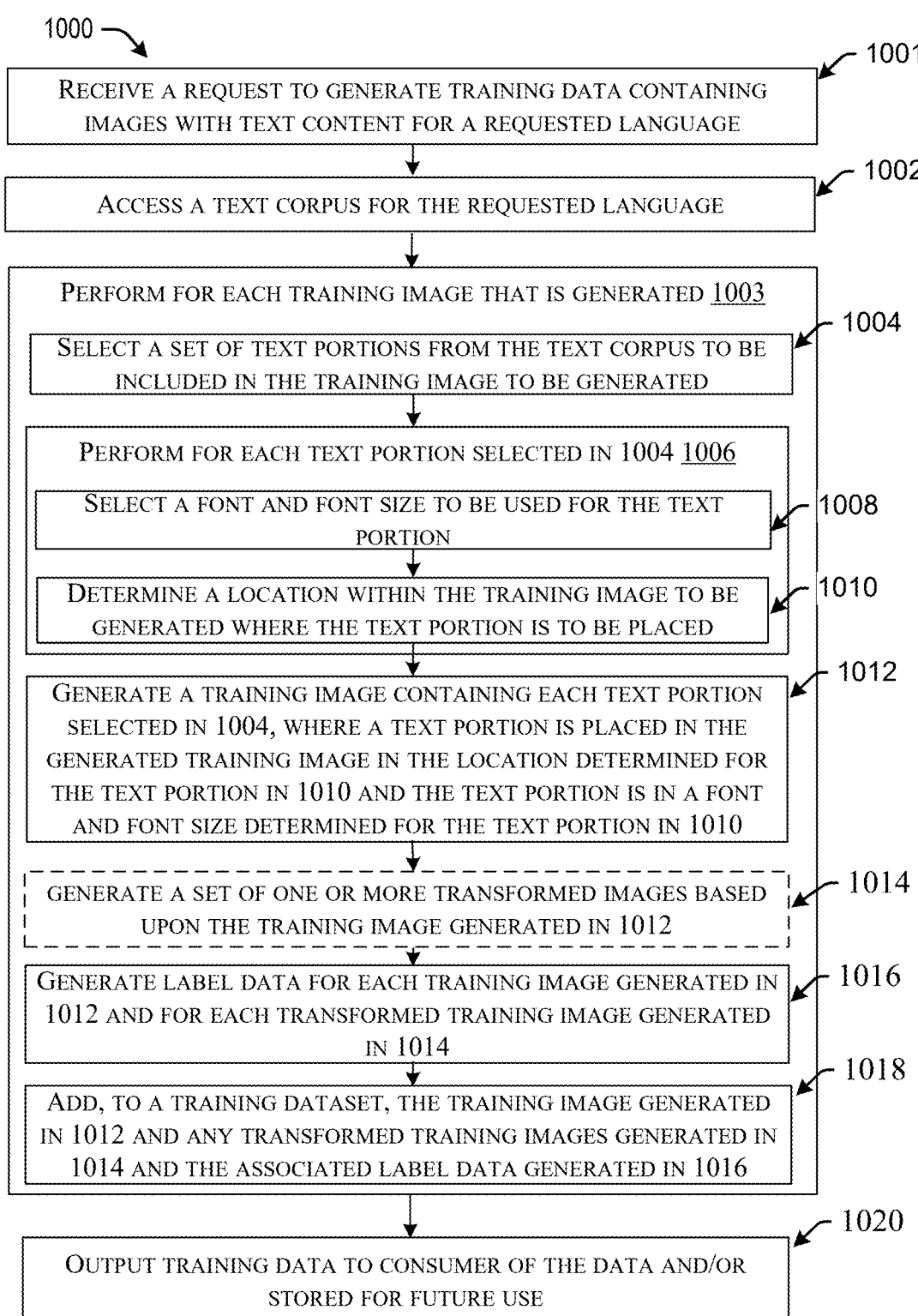

1000

1001 RECEIVE A REQUEST TO GENERATE TRAINING DATA CONTAINING IMAGES WITH TEXT CONTENT FOR A REQUESTED LANGUAGE

1002 ACCESS A TEXT CORPUS FOR THE REQUESTED LANGUAGE

PERFORM FOR EACH TRAINING IMAGE THAT IS GENERATED 1003

1004 SELECT A SET OF TEXT PORTIONS FROM THE TEXT CORPUS TO BE INCLUDED IN THE TRAINING IMAGE TO BE GENERATED

PERFORM FOR EACH TEXT PORTION SELECTED IN 1004 1006

1008 SELECT A FONT AND FONT SIZE TO BE USED FOR THE TEXT PORTION

1010 DETERMINE A LOCATION WITHIN THE TRAINING IMAGE TO BE GENERATED WHERE THE TEXT PORTION IS TO BE PLACED

1012 GENERATE A TRAINING IMAGE CONTAINING EACH TEXT PORTION SELECTED IN 1004, WHERE A TEXT PORTION IS PLACED IN THE GENERATED TRAINING IMAGE IN THE LOCATION DETERMINED FOR THE TEXT PORTION IN 1010 AND THE TEXT PORTION IS IN A FONT AND FONT SIZE DETERMINED FOR THE TEXT PORTION IN 1010

1014 GENERATE A SET OF ONE OR MORE TRANSFORMED IMAGES BASED UPON THE TRAINING IMAGE GENERATED IN 1012

1016 GENERATE LABEL DATA FOR EACH TRAINING IMAGE GENERATED IN 1012 AND FOR EACH TRANSFORMED TRAINING IMAGE GENERATED IN 1014

1018 ADD, TO A TRAINING DATASET, THE TRAINING IMAGE GENERATED IN 1012 AND ANY TRANSFORMED TRAINING IMAGES GENERATED IN 1014 AND THE ASSOCIATED LABEL DATA GENERATED IN 1016

1020 OUTPUT TRAINING DATA TO CONSUMER OF THE DATA AND/OR STORED FOR FUTURE USE

FIG. 10

1100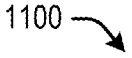

RECEIVE A REQUEST TO GENERATE A TRAINING DATA IMAGE AND ASSOCIATED LABEL DATA, WHERE THE TRAINING IMAGE CONTAINS TEXT CONTENT IN A REQUESTED LANGUAGE OVERLAID ON A BACKGROUND IMAGE ⟋ 1101

PERFORM PROCESSING AS DESCRIBED IN 1002, 1004, 1006 (INCLUDING 1008, 1010) ⟋ 1102

FROM AN INPUT CORPUS OF IMAGES, SELECT AN IMAGE TO BE USED AS A BACKGROUND FOR THE TRAINING IMAGE TO BE GENERATED ⟋ 1104

GENERATE A TRAINING IMAGE CONTAINING EACH TEXT PORTION SELECTED IN 1102 (1004), WHERE A TEXT PORTION IS PLACED IN THE GENERATED TRAINING IMAGE IN THE LOCATION DETERMINED FOR THE TEXT PORTION IN 1102 (1010) AND THE TEXT PORTION IS IN A FONT AND FONT SIZE DETERMINED FOR THE TEXT PORTION IN 1102 (1008), AND THE IMAGE SELECTED IN 1104 IS THE BACKGROUND IN THE GENERATED TRAINING IMAGE ON WHICH THE TEXT PORTIONS ARE OVERLAID ⟋ 1106

GENERATE A SET OF ONE OR MORE TRANSFORMED IMAGES BASED UPON THE TRAINING IMAGE GENERATED IN 1106 ⟋ 1108

GENERATE LABEL DATA FOR THE TRAINING IMAGE GENERATED IN 1106 AND FOR EACH TRANSFORMED TRAINING IMAGE GENERATED IN 1108 ⟋ 1110

ADD, TO A TRAINING DATASET, THE TRAINING IMAGE GENERATED IN 1106 AND ANY TRANSFORMED TRAINING IMAGES GENERATED IN 1108 AND THE ASSOCIATED LABEL DATA GENERATED IN 1110 ⟋ 1112

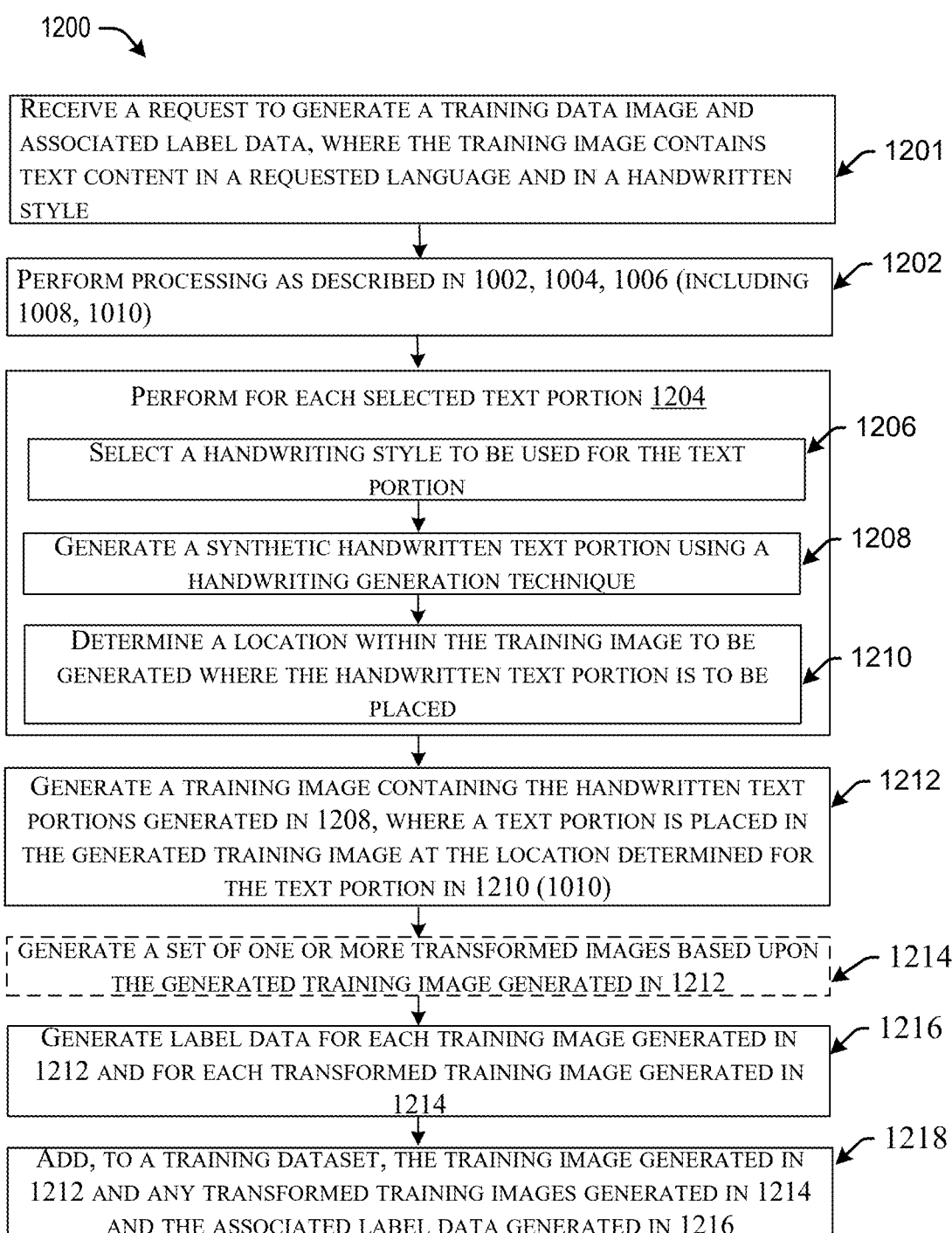

RECEIVE A REQUEST TO GENERATE A TRAINING DATA IMAGE AND ASSOCIATED LABEL DATA, WHERE THE TRAINING IMAGE CONTAINS TEXT CONTENT IN A REQUESTED LANGUAGE AND IN A HANDWRITTEN STYLE — 1201

PERFORM PROCESSING AS DESCRIBED IN 1002, 1004, 1006 (INCLUDING 1008, 1010) — 1202

PERFORM FOR EACH SELECTED TEXT PORTION 1204 — 1206

SELECT A HANDWRITING STYLE TO BE USED FOR THE TEXT PORTION

GENERATE A SYNTHETIC HANDWRITTEN TEXT PORTION USING A HANDWRITING GENERATION TECHNIQUE — 1208

DETERMINE A LOCATION WITHIN THE TRAINING IMAGE TO BE GENERATED WHERE THE HANDWRITTEN TEXT PORTION IS TO BE PLACED — 1210

GENERATE A TRAINING IMAGE CONTAINING THE HANDWRITTEN TEXT PORTIONS GENERATED IN 1208, WHERE A TEXT PORTION IS PLACED IN THE GENERATED TRAINING IMAGE AT THE LOCATION DETERMINED FOR THE TEXT PORTION IN 1210 (1010) — 1212

GENERATE A SET OF ONE OR MORE TRANSFORMED IMAGES BASED UPON THE GENERATED TRAINING IMAGE GENERATED IN 1212 — 1214

GENERATE LABEL DATA FOR EACH TRAINING IMAGE GENERATED IN 1212 AND FOR EACH TRANSFORMED TRAINING IMAGE GENERATED IN 1214 — 1216

ADD, TO A TRAINING DATASET, THE TRAINING IMAGE GENERATED IN 1212 AND ANY TRANSFORMED TRAINING IMAGES GENERATED IN 1214 AND THE ASSOCIATED LABEL DATA GENERATED IN 1216 — 1218

*FIG. 12*

AUTOMATED GENERATION OF TRAINING DATA COMPRISING DOCUMENT IMAGES AND ASSOCIATED LABEL DATA

BACKGROUND

Various models, including machine learning models, are increasingly being used to process electronic document images and make predictions about the document images. For instance, various language models (e.g., deep-learning based OCR models) are being used to make language-related predictions for images of documents (referred to as document images) where the images contain some text portions and the models are trained to make predictions based upon the text portions. For example, language models are being used to determine the dominant language in an image based upon the text content in the image, to translate the text or a portion of text in an image from an original language to a different language, and the like.

Many of these language models are trained using supervised training techniques. As part of such supervised training, a model is trained using training data, where the training data comprises of a set of training data points and one or more labels associated with each training data point in the set. For example, for a language model that is being trained to analyze images and determine the dominant language in each image, as part of the training, the model is trained to identify the locations of text portions in an image, then identify the text content in each text portion, and then identify the language of the text content. The training data that is used to train such a model may include a set of training document images and a set of one or more labels (also referred to as label data) for each training document image, where the labels associated with a training image include information such as the location of text portions within the image, and for each text portion, an indication of the text content in the text portion.

A large amount of training data is needed for properly training a model to ensure that the model is both accurate and reliable. The availability of such training data for images is however very limited, mainly due to a paucity of label data. This is because, currently, the label data for each training image is generated manually. This is a very tedious and time-consuming task. The reduced availability of training data severely hampers a data scientist's ability to train and build accurate and reliable language models that process images. For example, millions of training data samples are typically needed to properly train a deep neural network model to perform language-related predictions for input images. Such large numbers of training samples are not available and are very difficult to procure. The situation is even far worse for non-English languages.

As a result, a very limited amount of images-based training data is available for training language models. While efforts are being made to increase the amount of such training data, due to the label data having to be generated manually, these efforts are very time and resource intensive and not scalable. These limitations provide a big hurdle in generating accurate and reliable language models.

SUMMARY

The present disclosure relates generally to automated techniques for generating training data that can be used for training machine learning models that are being trained to process images. More particularly, techniques are described for automatically, and substantially without human intervention, generating training data where the training data includes a set of training images containing text content and associated label data. Various embodiments are described herein, including methods, systems, non-transitory computer-readable storage media storing programs, code, or instructions executable by one or more processors, and the like.

In certain embodiments, techniques are described herein that automatically generate both the training images and the associated label data. The label data that is automatically generated for a training image includes a label identifying locations of one or more text portions (e.g., demarcated by bounding boxes) within the training image, and for each text portion, a label indicative of the text content in the text portion. By automating both the generation of training images and the generation of associated label data, the techniques described herein are very scalable and repeatable and can be used to generate large amounts of training data, which in turn enables building more reliable and accurate language models. The automated techniques described herein can be used to generate training data for images containing English language text and also for other languages.

A training dataset generation system (TDGS) is described that can automatically generate both the training images and the associated label data. The generated images and the accompanying generated label data may then be used as a training dataset for training machine learning models, especially language models. Since both the training images and the associated label data are generated automatically, and substantially free of any manual intervention, a large amount of training data can be generated efficiently in a very quick time. This dramatically, and by an order of several magnitudes, increases the amount of training data that is available for training various machine learning models, such as for models configured to make language-based predictions for images containing text content. This increase in available training data helps a data scientist develop and train better, more accurate, and more reliable language models without having to worry about the availability of training data. Further, the techniques described herein can be used to generate training data for multiple languages including for English and also for other non-English languages.

In certain embodiments, various different types of training images may be automatically generated along with their associated label data. For example, as described herein, the TDGS can automatically generate training images containing text content and their associated label data. The TDGS can also generate training images containing text content and image content, where the image contents act as background to the text content in a generated image, and associated label data. The TDGS can also generate training images containing synthetically generated handwritten representations of text content and associated label data. The TDGS can also vary the fonts, font sizes, and formats (e.g., paragraphs, line spacing, borders, etc.) used for generating the training images. In this manner, a diverse set of training images and their associated label data can be automatically generated by the TDGS. This diversity in the training dataset translates to better training resulting in trained models that are more universally applicable, accurate, and robust for use in various use cases and applications.

The foregoing, together with other features and embodiments will become more apparent upon referring to the following specification, claims, and accompanying drawings.

BRIEF DESCRIPTION OF DRAWINGS

FIG. 3A illustrates a first example training image with a series of text lines, according to at least one embodiment.

FIG. 3B illustrates a second example training image with bounding boxes bounding the series of text lines, according to at least one embodiment.

FIG. 6 is an illustration of multiple text lines with multiple handwritten font types, according to at least one embodiment.

FIG. 10 is a flow process for generating a set of training images from a set of text portions.

FIG. 11 is a flow process for generating a training image including a text portion and a background image.

FIG. 12 is a flow process for generating a training image including a text portion comprising a handwritten text font.

DETAILED DESCRIPTION

Figure 1:
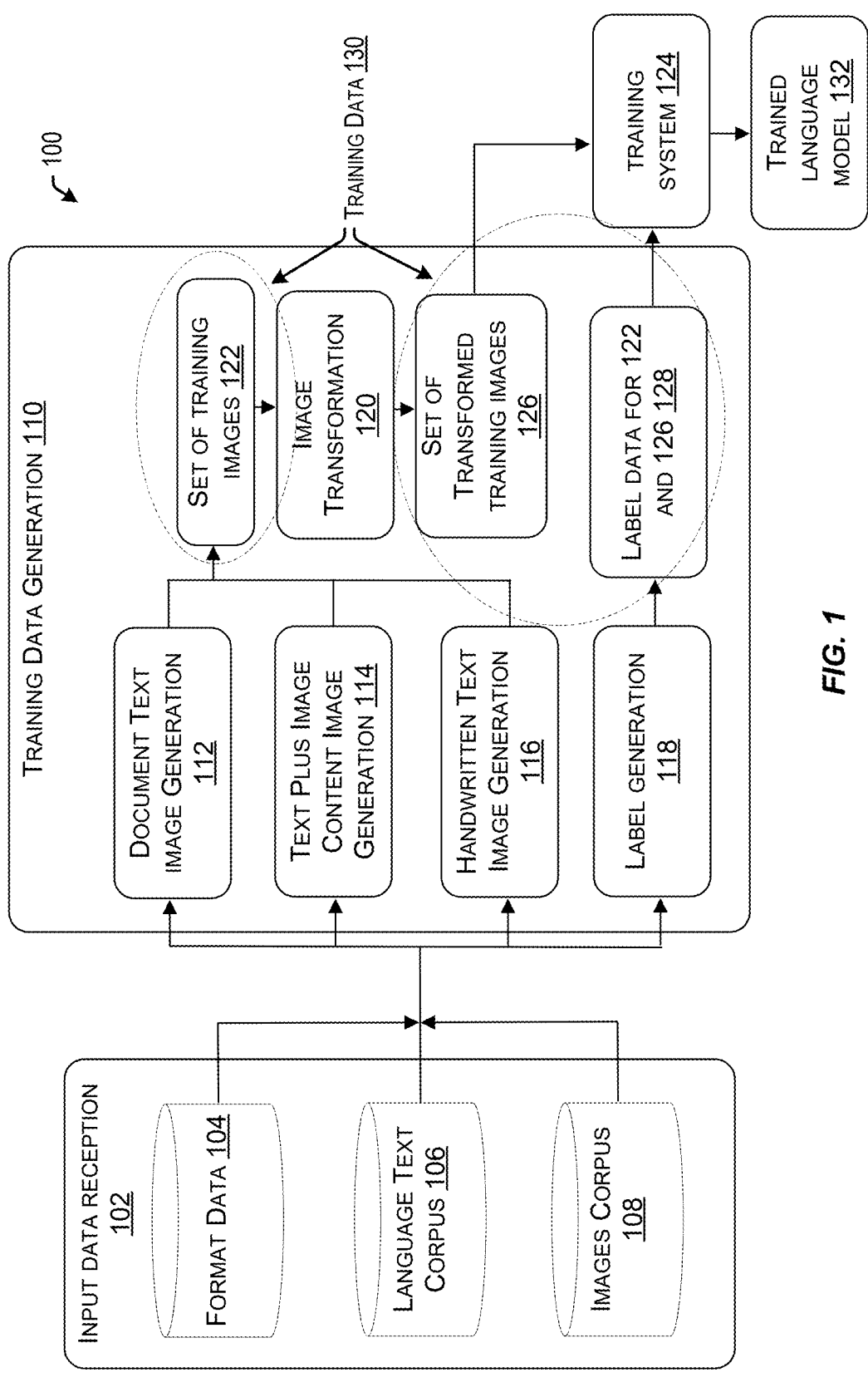
FIG. 1 is a flow process for generating a set of text-based training images for training a language model, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to automated techniques for generating training data that can be used for training machine learning models that are being trained to process images. More particularly, techniques are described for automatically, and substantially without human intervention, generating training data where the training data includes a set of training images containing text content and associated label data. Various embodiments are described herein, including methods, systems, non-transitory computer-readable storage media storing programs, code, or instructions executable by one or more processors, and the like.

In certain embodiments, techniques are described herein that automatically generate both the training images and the associated label data. The label data that is automatically generated for a training image includes one or more labels identifying locations of one or more text portions (e.g., demarcated by bounding boxes) within the training image, and for each text portion, a label indicative of the text content in the text portion. By automating both the generation of training images and the generation of associated label data, the techniques described herein are very scalable and repeatable and can be used to generate large amounts of training data, which in turn enables building more reliable and accurate language models. The automated techniques described herein can be used to generate training data for images containing English language text and also for other languages.

A training dataset generation system (TDGS) is described that can automatically generate both the training images and the associated label data. The generated images and the accompanying generated label data may then be used as a training dataset for training machine learning models, especially language models that are trained for receiving images (e.g., document images) as input and are configured to make a prediction based upon the contents of the images, such as based upon the text contents of the images. Since both the training images and the associated label data are generated automatically, and substantially free of any manual intervention, a large amount of training data can be generated efficiently in a very quick time. This dramatically, and by an order of several magnitudes, increases the amount of training data that is available for training various machine learning models, such as for models configured to make language-based predictions for images containing text content. This increase in available training data helps a data scientist develop and train better, more accurate, and more reliable language models without having to worry about the availability of training data. The techniques described herein can be used to generate training data for multiple languages including for English and also for other non-English languages (e.g., Russian, Spanish, Greek, etc.).

In certain embodiments, various different types of training images may be automatically generated along with their associated label data. The type of a training image is determined based upon the contents included in the training image. For example, as described herein, the TDGS can automatically generate training images containing text content and generate associated label data. The TDGS can also generate training images containing text content and image content, where in a training image, the text content is overlaid on the image content (e.g., the image content acts as background to the text content), and generate associated label data. The TDGS can also generate training images containing synthetically generated handwritten representations of text content and associated label data. The TDGS can generate training images with different combinations of text content, image content, and handwritten text content. The TDGS can vary the fonts, font sizes, and formats (e.g., paragraph formats, line spacing, borders, etc.) used for generating the training images. In this manner, a diverse set of training images and their associated label data can be automatically generated by the TDGS. This diversity in the training dataset translates to better training, which in turn results in better trained models that are more universally applicable, accurate, and robust for use in various use cases and applications.

In certain embodiments, the inputs provided to the TDGS may include a corpus text for a targeted language, a set of fonts and font sizes, a set of formats, a corpus of images, and a set of handwriting styles. The corpus of text for a language is typically a set of documents that includes text (e.g., words, punctuations, sentences) that is representative of the language. For example, for the English language, the corpus of text may include the basic elements of the English language, such as the twenty-six letters and ten digits, text comprising various combinations of the letters, digits and special characters including punctuations (e.g., commas, periods, question marks, etc.) and white spaces. Based upon the inputs, the TDGS is configured to automatically generate training images containing various combinations of the text content, image content, and handwriting content in various fonts and font sizes and placed in different locations in the training images where the training document images themselves can be in various formats. The TDGS is also configured to generate label data for the generated training document images. For example, some generated images may include only text content, others may include text content and image content, while others may include just handwritten content or handwritten content along with text and/or image content, and the like. In certain implementations, the type of training images generated by the TDGS is user configurable.

As described in the Background section, presently, the availability of training data containing images with text content and their associated label data is very limited, primarily due to the paucity of label data. For some languages other than English, even the availability of images containing text content in the desired language is limited. Further, even if image datasets are available, generating label data for the images (e.g., generating labels for an image that identifies the location of text portions within the image and the contents of each text portion) is a manual task and thus is a very tedious, time consuming, and human resources intensive task. For example, humans are used to manually scan documents to generate document images. Human labelers are then used to manually review each scanned image, manually tag portions of the image containing text content portions, and for each text content portion manually enter the actual text in that portion. This manual generation of training data can take a long time to generate the training data.

The techniques described herein provide several technical advantages over the current way of generating training images and associated label data. As described herein, both the task of generating training images and the task of generating label data for the training images is automated and performed by the TDGS substantially free of any human intervention. The techniques described herein are reliably repeatable and thus scalable. Due to this automation, a large amount of training data can be generated quickly and efficiently. This increases the amount the training data available for training language models, which in turn improves the accuracy, robustness, and reliability of these models.

Additionally, various different types of training images may be automatically generated based upon desired user preferences. For example, as described herein, the TDGS can automatically generate training images containing only text content and their associated label data. The TDGS can also generate training images containing text content and image content, where the image content acts as background to the text content, and associated label data. The TDGS can also generate training images containing synthetically generated handwritten representations of text content and associated label data. The TDGS can also vary the font, font sizes, and formats (e.g., paragraphs, line spacing, borders, etc.) used for generating the training images. Accordingly, a diverse set of training images and their associated label data can be automatically generated by the TDGS. This diversity in the training dataset translates to training that generates a model that is more universally applicable, accurate, and robust in various use cases and applications.

The techniques described herein can be used for generating training images and associated label data for multiple different languages, including English, Greek, Russian, Spanish, and other languages. Language models can thus be developed and trained for various different languages. Further, the present embodiments can combine the ability to generate text images in scene-text, form-text, and handwritten-text scenarios to improve the training process of multi-lingual OCR models. The models can be more robust by using the diversified generated data and also overcoming the lack-of-data problem for multi-lingual document OCR model training.

The TDGS can generate training images with different transformations. For example, a first training image can be rotated while a second training image can be degraded to reduce the image quality. Diversification of transformations across training images can result in the generation of more robust models that can more accurately process and identify content in real-world images provided to the TDGS.

In certain implementations, the TDGS may be implemented as a system comprising one or more computing device, each computing device comprising one or more processors. The one or more processors may be configured to execute code or instructions that causes the TDGS to perform the various functions and tasks described in this disclosure. The code or instructions may be stored on in non-transitory memory, including volatile or non-volatile memory.

In certain implementations, the TDGS may be implemented as part of a cloud service infrastructure provided by a cloud services provider (CSP). The functions offered by the TDGS such as the automatic generation of training data including training images and associated label data, may be offered as a cloud service by the CSP. A customer of the CSP may subscribe to such a service and avail of the functionality provided by the TDGS.

FIG. 1 depicts a high-level simplified flow process 100 for generating training data that can be used for training a machine learning model (e.g., a language model) where the training data includes a set of images including text content and associated label data according to certain embodiments. The image generation pipeline can be used to train multi-lingual models (e.g., OCR models). In certain implementations, the process may be executed by a TDGS.

At 102, the TDGS can receive a set of inputs that are used for the automated generating of the training images and the associated label data. The inputs can include fonts and format data 104, language text corpus 106, and images corpus 108. Fonts and format data 104 can include information about various different font styles, font sizes, document format, etc. that can be used by the TDGS to generate training images. In certain embodiments, fonts and format data 104 may also include information about handwriting styles that may be used by the TDGS to synthetically generate handwritten representations of text content, where the handwritten representations are included in the training images generated by the TDGS.

Images corpus 108 may include various images that the TDGS may select from for image content to be included in one or more training images. In certain implementations, the selected images are used as background for the text content in a training image, i.e., in the training image, the text content is overlaid on a background image.

Language text corpus 106 may include text content that is representative of the language for which the training data is to be generated. For example, the language text corpus 106 for the English language may include content including the basic elements of the English language, such as the twenty-six letters and ten digits, text such as words and sentences comprising various combinations of the letters, digits and special characters including punctuations (e.g., commas, periods, question marks, etc.) and white spaces. Text corpus 106 may include one or more digital documents such as web pages, documents created using a document editor (e.g., Microsoft WORD), blogs, emails, and the like.

At 110, the TDGS generates training data comprising a set of training images and associated label data. As shown in FIG. 1, the task 110 of generating the training data comprises various subtasks including subtasks document text image generation 112, text plus image content image generation 114, handwritten text image generation 116, label generation 118, and/or image transformation 120, each of which is described below.

Document text image generation task 112 generates training images that contain text content. In certain implementations, this task may involve selecting, from the language text corpus 106, text content to be included in the training images to be generated. In certain implementations, the text (e.g., words, lines) for each training image may be randomly selected from corpus 106. Task 112 may also include determining, for each training image to be generated, where (i.e., the location) in the training image the selected text content is to be placed. Task 112 may also include determining, based upon fonts and format information 104, the font and the font size to be used for placing the selected content into a training image and the format (e.g., borders, paragraph structure, invoice format, receipt format, a form format) for the training image. Finally, task 112 includes generating one or more training images that contain text content.

Text plus image content image generation 114 task can include the tasks performed as part of 112 and additionally the selection and insertion of image content to one or more training images to generate training images with text content overlaid on image content. The image content, which acts as background for the text content in a training image, may be selected from background images 108. The background images can provide varying contrasts between the text and the background image.

The handwritten text image generation 116 task generates training images that include handwritten text content. This task can include the tasks performed as part of 112 and additionally the selection of text content that is to be placed in the training images as handwritten text. For this selected content, the handwritten representation of the selected text is generated and then placed in a training image that is generated. Various handwriting styles and fonts may be selected from fonts and format information 104 for the handwritten text. A training image containing handwritten text can also optionally contain other text content and possibly image content.

Various different techniques may be used for the selection of fonts, font sizes, formats, images, handwriting styles, etc. In certain implementations, these may be randomly selected for individual training images. In other implementations, a set of rules may be configured for the TDGS, where the rules control the selection.

The output of tasks 112, 114, and 116 is a set of synthetically generated training images 122. At 120, optionally, one or more images from the set of training images 122 can be transformed via an image transformation process to generate a set of transformed training images 126. Image transformation can include modifying an original training image by applying one or more transformations to the training image, wherein each transformation modifies one or more aspects of the training image. For example, transformations may include transformations that degrade an image such as obscuring portions of the image, ghosting certain text content within the image, reducing the contrast ratio between the text and its background image content in an image, watering down an image, blurring certain content within an image, increasing or reducing the brightness of an image, changing the white balance of an image, changing an image from color to black-and-white or vice versa, changing the gray tone of an image, and the like. Transformations may also include rotating the text by an certain angle, misaligning text sentences within an image, and the like. Transformations may include transformation that increase the difficulty in identifying aspects of the image. In certain implementations, these transformations try to mimic the image degradation and changes that generally result from generating an image using a scanner or other image capture device.

Various different techniques may be used for selecting which transforms are to be applied to generate a transformed training image, and the order in which the transforms are to be applied. This may be set use user-configurable rules set for the TGDS.

At 118, label data 128 is generated for the set of training image 122 and, if any transformed training images are generated, also for the set of transformed images 126. In certain embodiments, the label data for each generated training image may include labels identifying the size and location of one or more text portions (e.g., line, paragraph, a set of words) within the training image, and the actual text content contained within each text portion. In certain implementations, the location information for a training image may be in the form of bounding boxes, with each bounding box representing and identifying a portion of the training image containing text content. For each bounding box, the label data may include a location of the bounding box within the training image and an indication of the text content in the bounding box.

Since the set of training images 122 are generated by the TDGS in tasks 112, 114, and 116, the TGDS is aware of, for each training image that is generated, what text/handwritten content is included in that image and the placement of that content in the image. As the result the location of text portions within a training image and the text content contained by those text portions is available to the TGDS since the TGDS was responsible for the selection and placement of the text/handwritten content in the training image. Further, for the set of transformed images 130, the TDGS is again responsible for performing the transform. The TDGS does knows the text portions and their content and locations in an original non-transformed training image and their corresponding positions in the transformed training image. Thus, even for transformed training images, the TDGS knows of the label data for the transformed images.

The set of training images 122, the set of transformed training images 126, and the label data 128 together represent the training data 130 that is automatically generated by the TDGS. The training images, both non-transformed and transformed, can include a combination of different types of training images, such as training images with text content only, training images with text content only overlaid on image content, training images with handwritten text content, and various combinations thereof. Any number of training images can be generated using the various tasks depicted in FIG. 1. The training data may be generated for content in English and/or for content in other non-English languages.

At 124, the generated training data 130 may be made available to a model training system 124, which may train one or more machine learning models using the training data. For instance, the model training system 124 may use the training data 130 train a neural network that is configured to find the dominant language in an image containing text content. The training may include training the model and also validating the model to attain a desired accuracy for the model.

Figure 2:
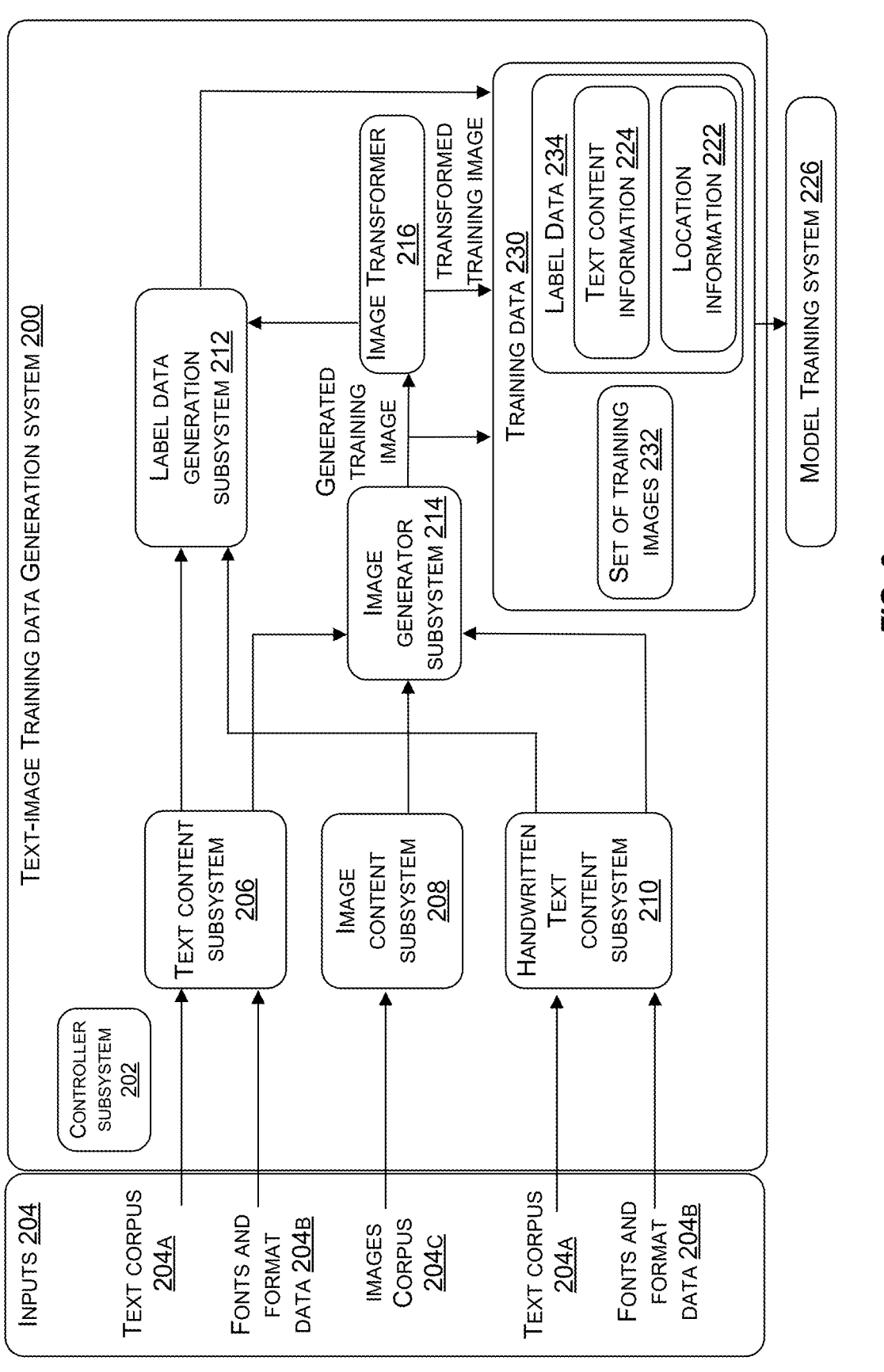
FIG. 2 illustrates an example text image generation system, according to at least one embodiment.

FIG. 2 depicts a simplified diagram of a training data generation system (TDGS) 200 that is configured to automatically generate training data comprising a set of training images and associated label data according to certain embodiments. In the embodiment depicted in FIG. 2, TDGS 200 comprises multiple subsystems and engines including a controller subsystem 202, a text content subsystem 206, an image content subsystem 208, a handwritten text content subsystem 210, an image generator subsystem 214, a label data generator subsystem 212, and an image transformer subsystem 216.

TDGS 200 depicted in FIG. 2 is merely an example and is not intended to unduly limit the scope of claimed embodiments. One of ordinary skill in the art would recognize many possible variations, alternatives, and modifications. For example, in some implementations, TDGS 200 may have more or fewer subsystems or components than those shown in FIG. 2, may combine two or more subsystems, or may have a different configuration or arrangement of systems. TDGS 200 including its various subsystems may be implemented only software, only hardware, or a combination of software and hardware. The software may be in the form of code, instructions, or scripts executable by one or more processors. The software may be stored on a non-transitory storage medium ore memory (e.g., on a memory device).

TDGS 200 may receive multiple inputs 204 that are used by TDGS 200 to automatically generate training data 230, where the training data 230 comprises a set of training images 232 and associated label data 234. For each training image 232, the label data 234 for that training image may include one or more labels indicative of location information 222 identifying the location or position of one or more text portions within the training image, and for each text portion, text content information 224 indicative of the text content contained by the text portion.

In the embodiment depicted in FIG. 2, the inputs 204 include a language text corpus 204A, fonts and format data 204B, and images corpus 204C. Fonts and format data 204B can include information about various different font styles, font sizes, document formats (e.g., borders, paragraph structures, left/center/right justification), etc. that can be used by TDGS 200 to generate training images 232. In certain embodiments, fonts and format data 204 may also include information about handwriting styles and fonts that may be used by TDGS 200 to synthetically generate handwritten text content to be included in the training images 232 generated by TDGS 200.

Images corpus 204C may include various images that TDGS 200 may select from for image content to be included in one or more training images 232. In certain implementations, the selected images are used as background for the text content in a training image, i.e., in the training image, the text content is overlaid on a background image.

Language text corpus 204A may include text content that is representative of the language for which training data is to be generated by TDGS 200. For example, the language text corpus 204A for the English language may include content including the basic elements of the English language, such as the twenty-six letters and ten digits, text such as words and sentences comprising various combinations of the letters, digits and special characters including punctuations (e.g., commas, periods, question marks, etc.) and white spaces. Text corpus 204A may include one or more digital documents such as web pages, documents created using a document editor (e.g., Microsoft WORD), blogs, emails, and the like. Language text corpus 204A can include a large number of texts (e.g., over a hundred thousand texts) that are representative of the language. Language text corpus 204A may be populated from various different data sources. For example, for English language content, the corpus may be populated from web pages (e.g., from Wikipages), digitally available books (e.g., the Bible), emails, blogs, and other sources of digital text documents.

TDGS 200 can generate training data for various different languages including English, and others. The language text corpus 204A includes text for the language for which training data is to be generated. For example, if the training data is to be generated for Greek language text content, then text corpus 204A may comprise corpus of Greek text content. For example, for generation of training images containing Greek content, corpus 204A may be populated from data sources providing Greek text content such as the European Parliament Proceedings Parallel Corpus (Europarl) dataset or a bible corpus dataset, etc.

Controller subsystem 202 enables a user of TDGS 200 to control the behavior of TDGS 200. For example, as described above and below, TDGS is capable of generating different types of training images containing different types of content. For example, in certain instances, TDGS 200 can generate training images that contain only text content. In some other instances, TDGS 200 can generate training images containing text content overlaid on an image background. In other instances, TDGS 200 can generate training images containing handwritten text content. In yet other instances, TDGS 200 can generate training images containing different combinations of content. A user can control the types of training images that TDGS generates by providing the requisite instructions to TDGS 200, or more specifically to controller subsystem 202. Controller sub 202 is then configured to control the operations of the various subsystems of TDGS 200 to generate the training images per the user's instructions. Accordingly, controller subsystem 202 provided an interface that a user of TDGS 200 can interact with to control the operations and behavior of TDGS 200.

Text content subsystem 206 is configured to perform functions related to the selection of text content and the placement of the text content within a training image to be generated by TDGS 200. TDGS 200 may select one or more text content pieces (text portions) to be included in a training image from language text corpus. A text portion may be a word, a set of words, a line of words, a paragraph of words, etc. For each selected text portion, text content subsystem 206 then determines the font and font size to be used for that selected text portion when it is placed in the training image. The font and font size may be selected based upon fonts and format data 204B, which may identify the various fonts and font sizes that are available for use by TDGS 200.

For each text portion, subsystem 206 is also configured to identify a location or position within the training image where the selected text portion is to be placed. As part of this processing, text content sub 206 may determine a format to be used for placing text content in the training image. The document format may be selected based upon fonts and format data 204B, which may identify the various document formats that are available for use by TDGS 200. In certain implementations, the position for a text portion is represented by a bounding box, where the bounding box contains the text portion and has a particular associated position within the training image that is generated using the text portion. It should be apparent that the same text portion can be positioned in different locations in different training images.

In certain embodiments, for each training image to be generated, information identifying the one or more text portions selected by text content subsystem 206 to be included in the training image, information identifying the font and font size to be used for each text, information identifying a location of the text portion within the training image, information identifying the format to be used for the training image, is communicated by text content subsystem 206 to image generator subsystem 214. Image generator subsystem 214 then uses this information to generate the training image.

For each text portion to be placed in a training image, text content subsystem 206 is also configured to communicate information regarding the text content of the text portion and the location of the text portion within a training image to label data generator subsystem 212, which generates label data for the training image based upon this information.

For a training image that is to include a background image over which text content is to be overlaid, image content subsystem 208 is configured to select an image, from images corpus 204C, to be used as the background image for the training image. Image content subsystem 208 then communicates information identifying the selected image to image generator 214. Image generator then uses the image to generate the training image in which the selected image is used as the background.

For a training image that is to include handwritten text content, handwritten text content subsystem 210 is configured to generate the handwritten text content to be included in the training image. In certain implementations, handwritten text content subsystem 210 is configured to first select text content from text corpus 204A. For the selected text content, subsystem 210 then determines a particular handwriting style, font, and font style to be used. The selected text content is then converted to its corresponding handwritten text representation using the selected handwriting style, font, and font style. Various different techniques may be used to generate the handwritten representation. Handwritten text content subsystem 210 then determines a location within the training image to be generated where the handwritten text representation is to be placed. The handwritten text representation and its determined position is then communicated by subsystem 210 to image generator 214. Image generator 214 then uses this information to generate the training image.

Image generator subsystem 214 is responsible for generating the training images based upon information received from subsystems 206, 208, and 210. For a training image to be generated, and depending upon the type of image (e.g., just text content, text content plus a background image, handwritten content, handwritten content plus text content, handwritten content plus text content plus background image, etc.), image generator subsystem 214 receives the content to be included in the image from text content subsystem 206, from image content subsystem 208, and/or from handwritten content subsystem 210. For text and handwritten content, image generator sub 214 also receives the font, the font size, and the position within the image where the content is to be placed. Image generator subsystem 214 then generates the training image such that the content is placed in the generated image per the font and font size and in a location determined for the content. For a training image in which a background image is to be included, subsystem 214 generates an image with the image content received from image content subsystem 208.

Label data generator subsystem 212 is configured to generate label data for each training image generated by image generator subsystem 214. In certain implementations, label data generator subsystem 212 generates the label information based upon information received from subsystems 206 and 210. For example, the information received by label data generator subsystem 212 from text content subsystem 206 includes, for each text portion in the training image, information indicative of the text to be placed in that text portion and the location of the text portion within the training image. Based upon this received information, label data generator subsystem 212 is configured to generate label data comprising one or more labels indicative of, for each text portion in the training image, the text content of the text portion and the location within the training image of the text portion. As another example, the information received by label data generator subsystem 212 from handwritten content subsystem 210 includes, for each handwritten text portion in the training image, information indicative of the handwritten text content to be placed in that handwritten text portion and the location of the handwritten text portion within the training image. Based upon this received information, label data generator 212 is configured to generate label data comprising one or more labels indicative of, for each handwritten text portion in the training image, the text content of the handwritten text portion and the location within the training image of the handwritten text portion. The labels data generated by label data generator subsystem 212 can include one or more labels indicative of the text or handwritten content and their corresponding locations within the training image. In certain implementations, the label data generator subsystem 212 can generate bounding box info specifying positions of text portions in a training image. For example, a bounding box may be generated for each text line within the training image.

Image generator subsystem 214 may generate multiple training images 232, with differing content. Label data generator subsystem 212 is configured to generate label data 234 for each of the generated training images 232, where the label data 234 includes location information 222 and text content information 224. These images 232 are included in the training image images 232 that are output by TDGS 200. The training images 232 and the label data 234 together represents the training data 230 that is automatically generated and output by TDGS 200.

In certain embodiments, optionally, one or more of the training images from training images 232 generated by image generator subsystem 214 may be provided to image transformer subsystem 216. Image transformer subsystem 216 is configured to generate a training image by applying one or more transformations to the input training image. Image transformer subsystem 216 may apply one or more transformation to the input image to generate a transformed training image corresponding to the input training image. Examples of these transforms include blurring an image, adding a border to the image, rotating some content of the image by a certain angle, adding noise to the image, changing the contrast of the image (or certain portions of the image), changing a color image to black and white or vice versa, and the like. Some transforms may result in a transformed image being generated that is a degraded version of the input training image. For an input training image, image transformer subsystem 216 may apply one or more transforms to generate the corresponding transformed training image. If multiple transforms are applied, image transformer subsystem 216 may select an order in which the transforms are added to the input training image. The transformed training images generated by image transformer subsystem 216 are also included in the training image 232 that are included in the training date 230 output by TDGS 200.

For each transformed training image generated by image transformer subsystem 216, information regarding the one or more transforms applied are communicated by subsystem 216 to label data generator subsystem 212. Based upon the information received from subsystem 216, label data generator subsystem 212 generates label data for each transformed training image. The transformation information received by label data generator subsystem 212 from image transformer subsystem 216 enables subsystem 212 to determine the location information for the text portions in the transformed training image. For example, if a transformed training image is generated by rotating a text portion in an input image to subsystem 216 in the clockwise direction by 45 degrees by, since label data generator subsystem 212 knows the text content in the text portion and the location of the text portion in the input training image based upon information received by subsystem 212 from text content subsystem 206 (or handwritten text content subsystem 210), based upon the transformation information received from subsystem 216, label image generator can generate the position information for that text portion in the transformed training image and the text content remains the same. In this manner, label data generator 212 is able to generate label data for each of the transformed training images.

The transformed training images are added to the set of training images 232 generated and output by TDGS 200. The label data generated by label data generator subsystem 212 is included in the label data 234.

Generating transformed training images and their corresponding label data and including this in the training data 230 has several advantages. For example, the transformed training images can simulate a quality and features of live images obtained at the TDGS. For instance, live images can be rotated, blurred, etc., and the training images as described herein can increase accuracy/efficiency in training the TDGS to identify content in training images wiht varying features.

The training data 230 generated by TDGS 200 can then be used to train one or more machine learning models, including one or more language models. For example, as shown in FIG. 2, the training data 230 may be provided to a model training system 226. Model training system 226 may use training data 230 or portions thereof to train one or more language models that are trained to process images and make predictions based upon the text or handwritten content of the images. For example, training data 230 may be used to train a language model to, given an input image document, predict the dominant language in the image document. Since training data 230 is automatically generated by TDGS 200, a large quantity of training data 230 may be automatically generated in a quick and efficient manner. The increased quantity of the training data 230 helps for better training, which in turn produces more accurate and stable trained language models. As part of the training, training data 230 or portions thereof may be used for training a model and also validating a model and may be used in various iterations of the training-validation cycle.

Figure 3A:
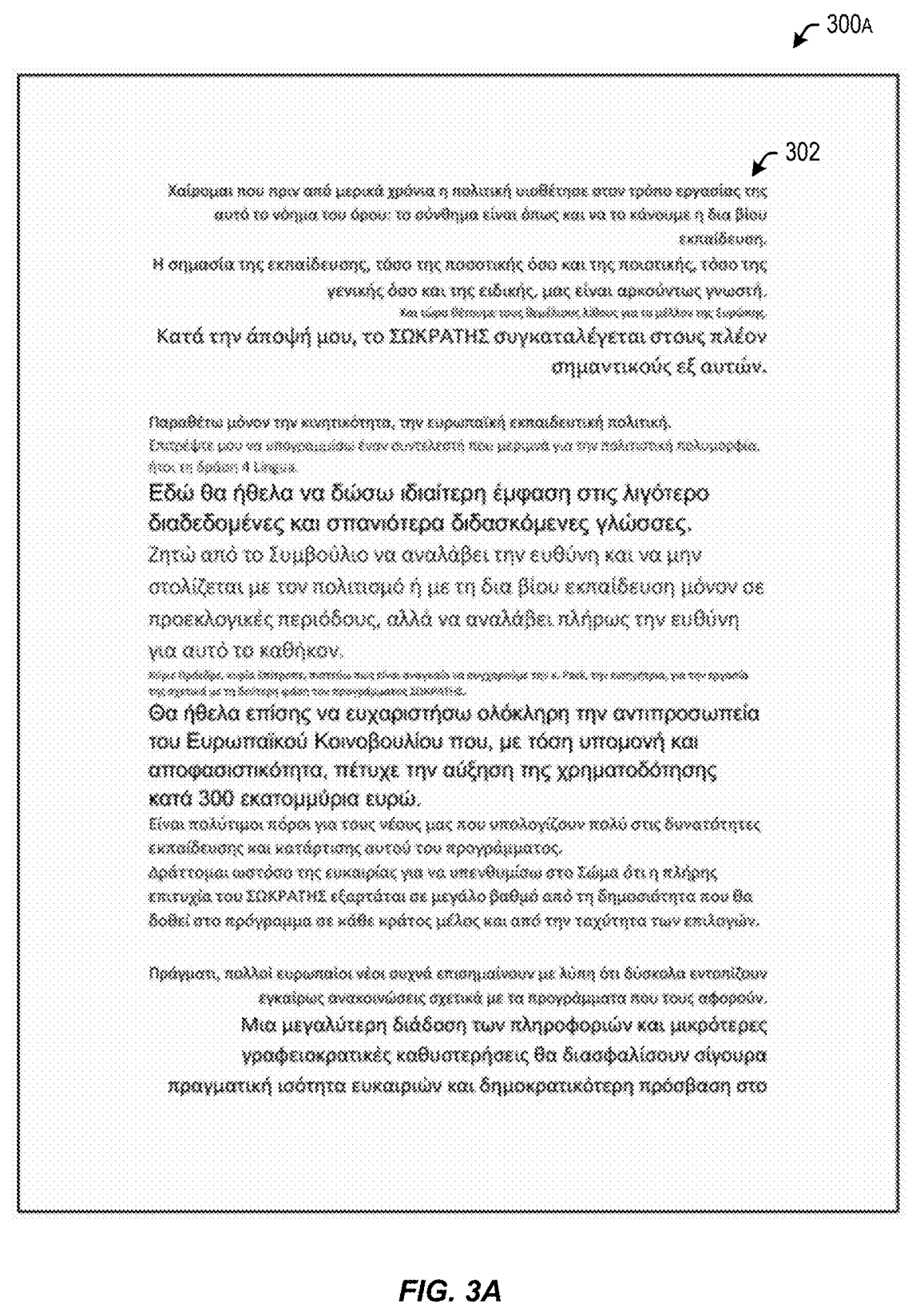

As described above, a series of text lines can be generated from a text corpus and inserted into one or more training images. FIG. 3A illustrates a first example training image 300*a* with a series of text lines according to certain embodiments. An image-based document can include a series of text lines in a format that is similar to various document-like files (e.g., forms, receipts). In the example as shown in FIG. 3A, an image-based document can be generated with text lines comprising the Greek language. Further, the generated document can comprise a printed document training dataset with different fonts, a different text corpus, and a white background.

As shown in FIG. 3A, a plurality of text lines with varying characteristics can be added to a training image. For instance, the text lines (e.g., text line 302) can include a number of random characters and/or words with varying lengths that can be added to the training image.

Further, the positioning (e.g., alignment) and font size of each text line can be modified to provide varying aspects of each text line. In some embodiments, characters/words for any of a number of languages can be selected for document text generation to train language models for multiple languages.

Figure 3B:
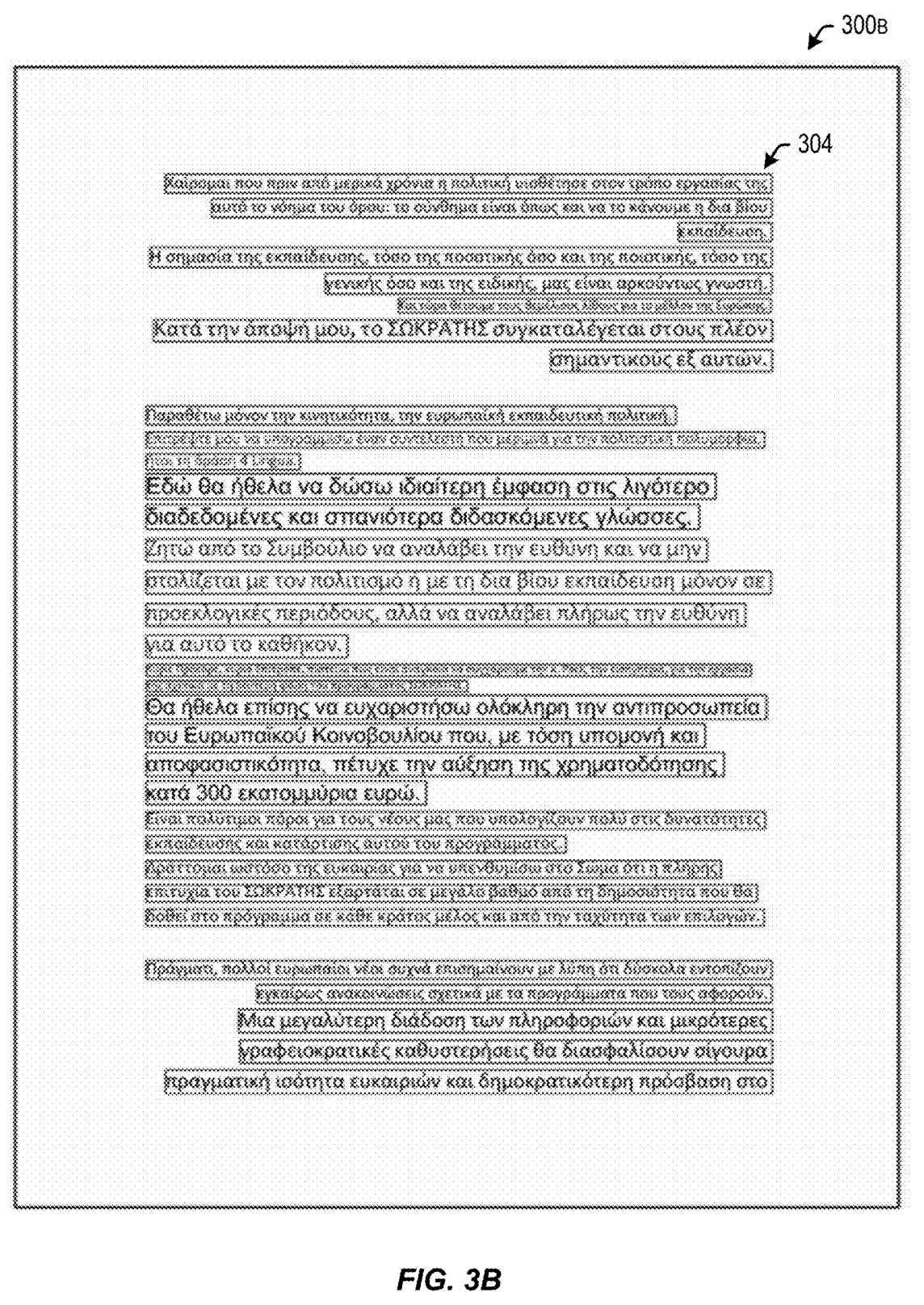

FIG. 3B illustrates a second example training image 300*b* with bounding boxes bounding the series of text lines according to certain embodiments. As shown in FIG. 3B, each text line can include a bounding box (e.g., 304) bounding each text line. The bounding boxes can be used to reduced overfitting of text lines in a training image. Further, the bounding boxes can assist in generating training images with varying font types, font sizes, and text line lengths to reduce overfitting and have random positions of each text line in the training image.

Figure 4:
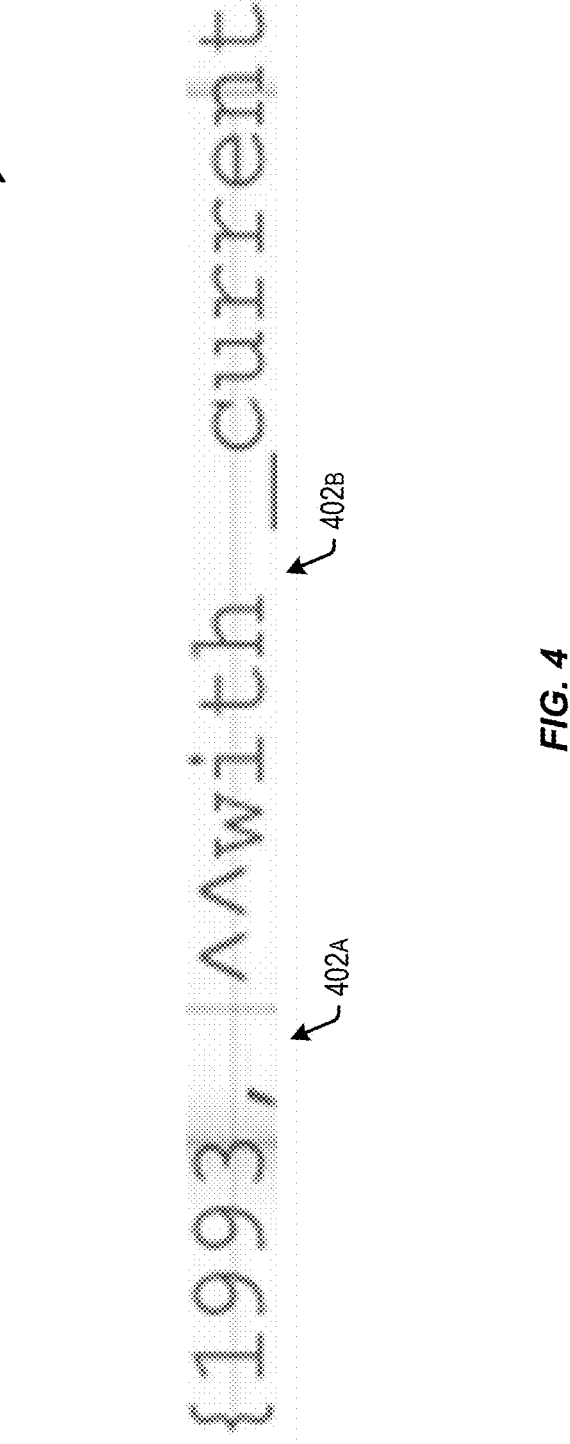
FIG. 4 illustrates an example text line, according to at least one embodiment.

FIG. 4 illustrates an example text line 400 according to certain embodiments. The text line 400 can include a combination of characters, numbers, symbols, words, etc. Further, the text line 400 can include white spaces 402*a-b* that can be used to train language models to identify such white spaces 402*a-b*. Each text line (e.g., 400) provided in a training image can be generated randomly using a language corpus for a specified language (e.g., English).

Further, as noted above, one or more training images can include a combination of a series of text lines and one or more background images. A synthetic scene-text generation tool can assist in detecting text within one or more images by generating a large amount of highly diversified scene-text images with various fonts and a language corpus as inputs, which can be used for training OCR models.

Figure 5A:
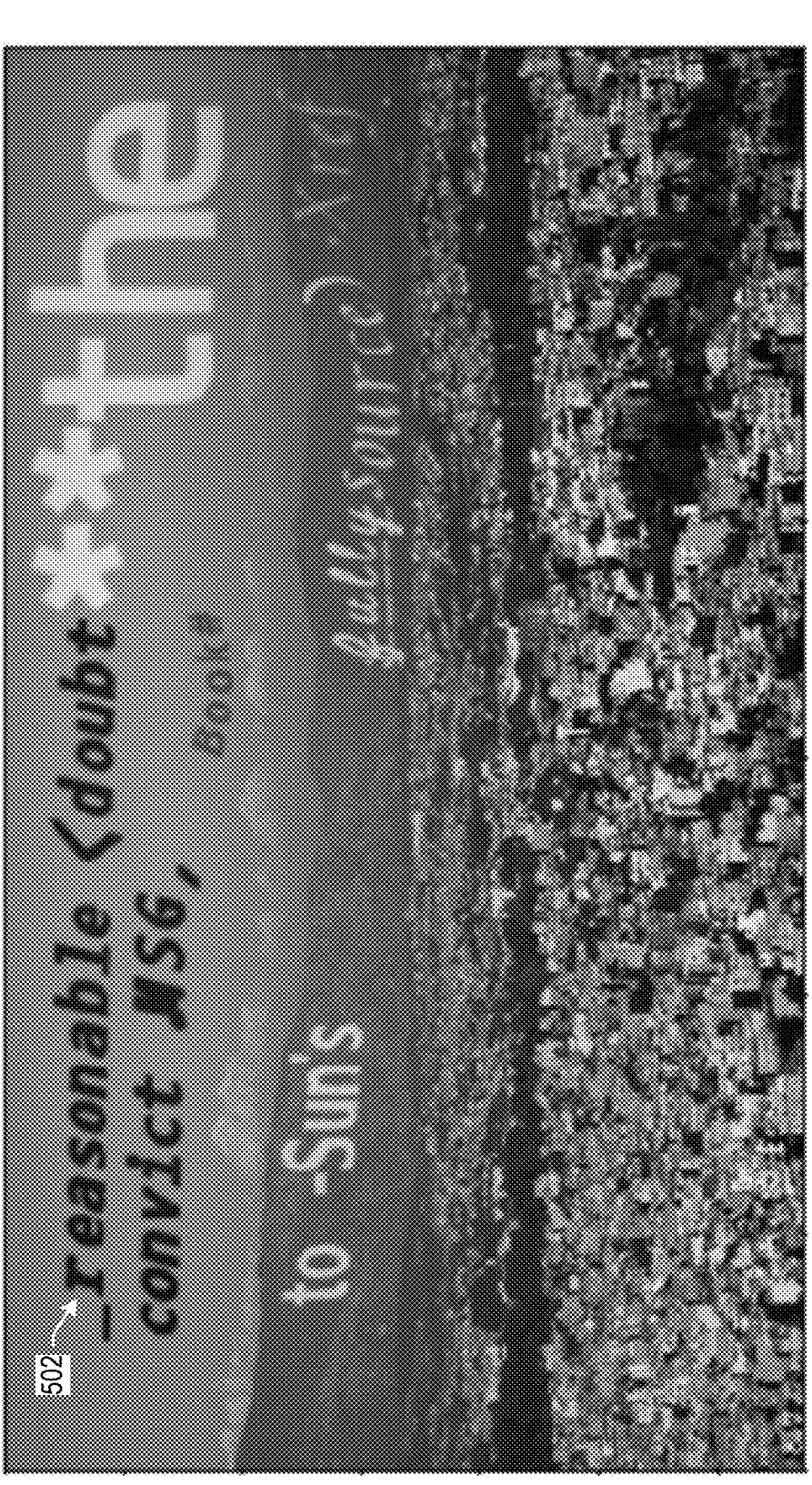
FIG. 5A illustrates a first example training image with a series of text lines and a background image, according to at least one embodiment.

FIG. 5A illustrates a first example training image 500*a* with a series of text lines and a background image according to certain embodiments. As shown in FIG. 5, a plurality of text lines (e.g., 502) can be disposed in the text image with a background image. The text lines can include a variety of lengths and characters and font styles and colors to provide various contrasts with the background image. The text lines can be randomly selected randomly positioned on the background image. The generation process can also record the ground truth and bounding boxes for each text line. The proposed generation tool can use different font types, font sizes, various effects of texts, and renders texts in random locations of one image to increase the data variation in the generated dataset.

Figure 5B:
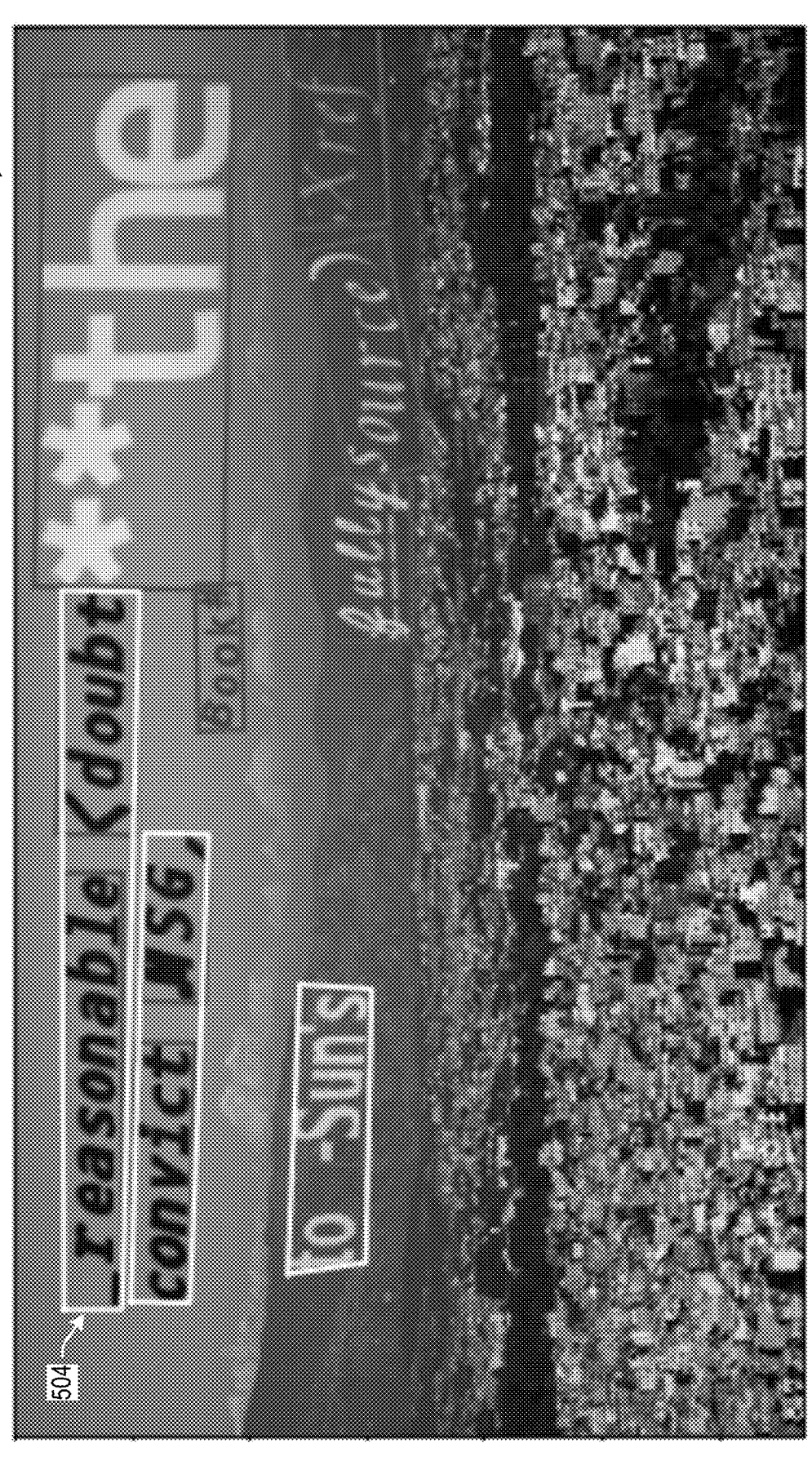
FIG. 5B illustrates a second example training image with a series of text lines with bounding boxes and a background image, according to at least one embodiment.

FIG. 5B illustrates a second example training image 500b with a series of text lines with bounding boxes and a background image according to certain embodiments. As shown in FIG. 5B, each text line can comprise a corresponding bounding box (e.g., 504). While the bounding boxes may not be included in the final training image, bounding boxes can be used to prevent overfitting of text lines in the training image. All text in the training images can be stored for subsequent processing and to generate training data to train the language model.

As noted above, any of the training images can include one or more different font types. The text lines can comprise one or more font types, such as handwritten fonts. Handwritten fonts can assist in training language models to identify handwritten text in various documents.

Figure 6:
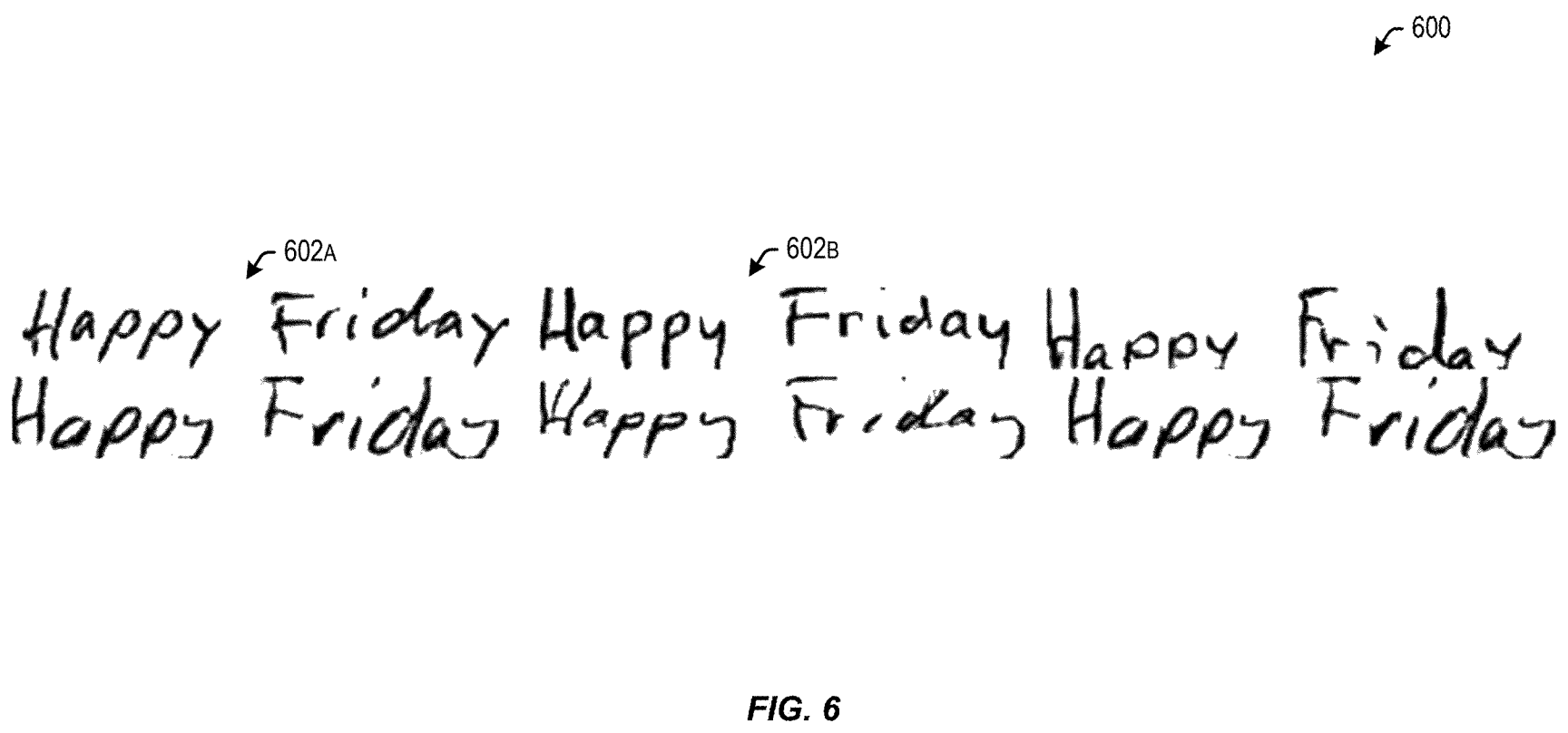

FIG. 6 is an illustration 600 of multiple text lines with multiple handwritten font types according to certain embodiments. As shown in FIG. 6, each text line can include various handwritten fonts (e.g., 602a, 602b). A generative adversarial networks (GAN) model can be used to generate the handwritten text images. The inputs can include line-level texts separated by space characters and random noise vectors. The GAN model can generate different writing styles for handwritten text images based on different noise vectors.

Many documents, when received by a text image generation system, can include transformed characteristics. For example, when electronically scanning a document, the contrast of text in the document can be reduced, increasing the difficulty for a model to identify text in such a document.

Figure 7:
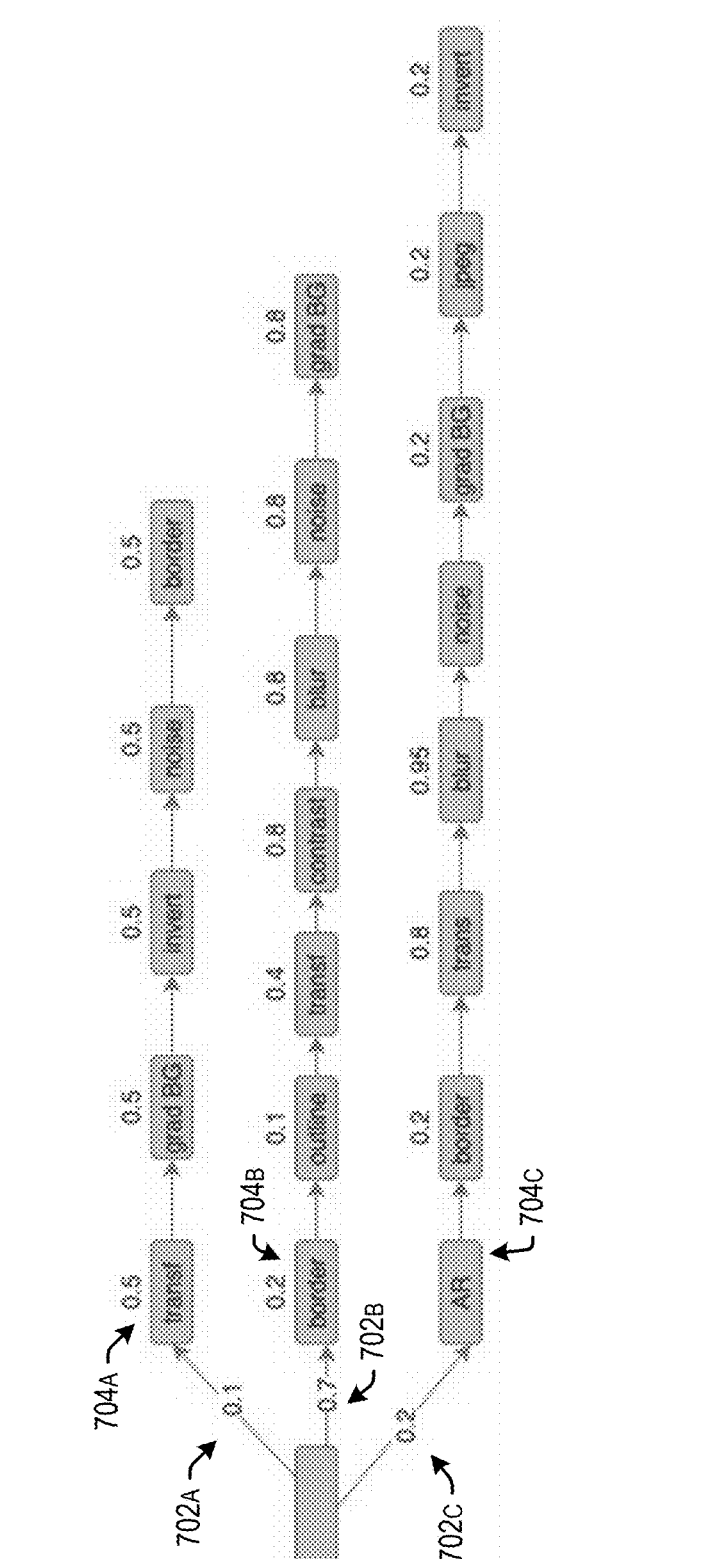
FIG. 7 is a flow diagram describing the implementation of the image transformation module to a set of training images, according to at least one embodiment.

In order to make generated images appear more realistic and increase accuracy in training models, an image transformation system can be applied to the generated text images. FIG. 7 is a flow diagram 700 describing the implementation of the image transformation module to a set of training images according to certain embodiments.

An image transformation module can include a plurality of transformation processes to randomly transform each text line in a training image. For example, for each text line/training image, a transformation process 702a-c can be selected based on probabilities for each process. In this example, a first transformation process 702 can have a probability of 0.1, indicating that there is a 10% chance of a given text line/training image to be transformation according to the first transformation process 702a.

Responsive to selection of an image transformation process, a number of steps can be performed according to the selected transformation process. Each transformation step can include weights that which path is chosen. For example, a first transformation step 704a can include a weight of 0.5, indicating a 50% likelihood that the step will be performed to the text line/training image. As another example, transformation step 704c can include no probability, indicating that the step will be performed to each text line/training image that is selected for the third transformation process 702c.

The transformation steps 704a-c can include various transformation processes. Example transformation steps can include border (which adds a border to the image), outline (adds a line at the end of the bottom), transf (performs a rotation or projective transformation), contrast (changes the image's contrast) aspect ratio (AR) (randomly changes aspect ratio), blur (applies blur effect-mimicking bad image quality), noise (add noise to the image), jpeg (add jpeg compression) grad background gradient (BG) (puts a gradient background images), invert (inverts colors of the image), etc.

Figure 8:
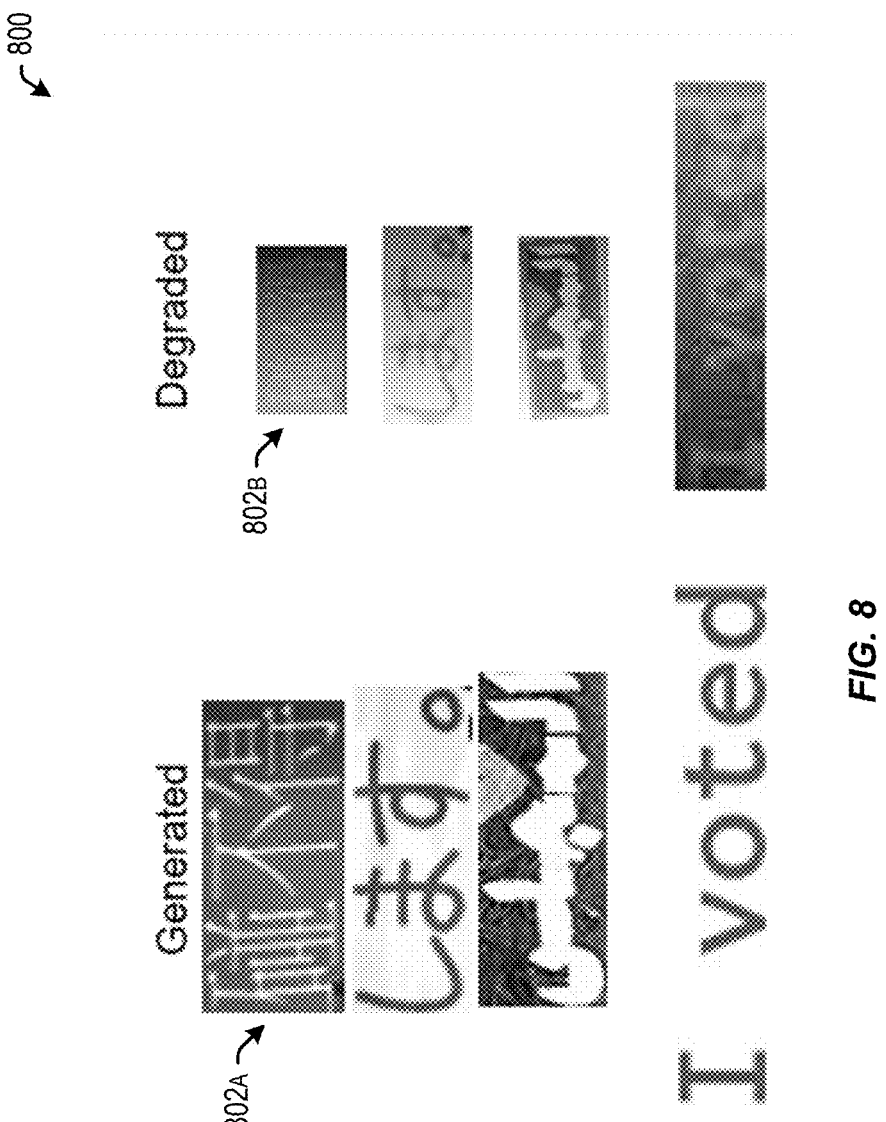
FIG. 8 is an illustration of a series of example text lines prior to and after an image transformation process, according to at least one embodiment.

FIG. 8 is an illustration 800 of a series of example text lines prior to and after an image transformation process according to certain embodiments. For example, as shown in FIG. 8, a first image 802a can be generated from the image generation processes as described herein, and the second image 802b can be the same image as a result of the image transformation process as described herein. The text lines/training images can be transformed using various processes to modify levels and magnitude of transformation to assist in training of language models.

Figure 9:
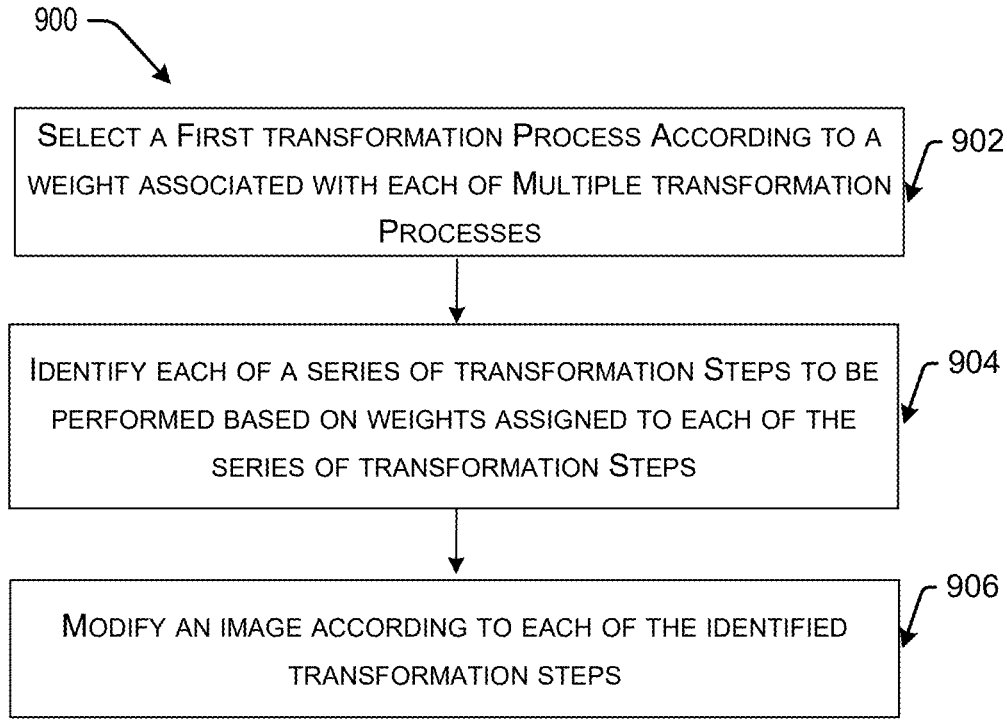
FIG. 9 is a flow diagram for implementing an image transformation process, according to at least one embodiment.

FIG. 9 is a flow diagram 900 for implementing an image transformation process according to certain embodiments. At 902, the process can include selecting a first transformation process of multiple transformation processes according to a first weight associated with each of the multiple transformation processes. A path can be selected based on weights assigned to each transformation process. For example, if a first path 702a has a weight of 0.1, this can include a 10% chance of selecting the first path.

At 904, the process can include identifying each of a series of transformation steps to be performed based on a set of weights assigned to each of the series of transformation steps. For example, if a first step is a transf step 704a with a weight of 0.5, this can include a 50% chance of performing the step. This process can be repeated for each step, creating a unique transformation process for each text line or training image. Varying the transformation steps for each training image can increase efficiency in training language models by providing training images with varying transformation severity to the language model.

At 906, the process can include modifying any of the set of text-based training images according to each of the identified transformation steps. Modifying the training images can include degrading features of the training image. For example, the series of image transformation tasks include any of adding a border to any text line in the set of text-based training images, adding a line below any text line in the set of text-based training images, rotating any images of the set of text-based training images, modifying a contrast of any images of the set of text-based training images, randomly modifying an aspect ratio of any images of the set of text-based training images, lowering an image quality of any images of the set of text-based training images, adding noise to any images of the set of text-based training images, adding a gradient background image to any images of the set of text-based training images, and inverting colors of any images of the set of text-based training images.

As described above, a set of training images can be generated for training a model. For example, text from a text corpus can be selected and used to derive a set of training images. FIG. 10 depicts a simplified flow chart 1000 depicting a method for generating a set of training images containing one or more text portions containing text content according to certain embodiments. The processing depicted in FIG. 10 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 10 and described below is intended to be illustrative and non-limiting. Although FIG. 10 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 2, the processing depicted in FIG. 2 may be performed by TDGS 200.

Processing may be initiated at 1001, when the TDGS can receive a request to generate training data for a particular language, where the training data is to include a set of training images containing text content and corresponding label data. The request received in 1001 may also indicate the type of training images to be generated. For the purposes of flowchart 100 depicted in FIG. 10, it is assumed that images containing text content without any background image are to be generated. For example, the request received in 1001 may request training data to be generated for the English language.

At 1002, the TDGS accesses a text corpus for the requested language that is to be used for generating the requested training data. The language text corpus accessed in 1002 may include various text content in the requested language. The corpus may comprise one or elements of a language (e.g., for English, the basic elements include the 26 letters and special characters such as punctuations (e.g., commas, periods, etc.) and white spaces.). The text corpus may contain one or more documents containing text in the particular language. For example, if the training images are to contain English text content, then an English text corpus may be accessed. If the training images are to be generated containing Greek text content, then a corpus of documents containing Greek text may be accessed in 1002.

The processing depicted in 1004, 1006, 1008, 1010, 1012, 1014, 1016, and 1018 is performed by the TDGS for each training image generated by the TDGS in response to the request received in 1002. At 1004, the TDGS can select a set of text portions from the language text corpus to be included in the training image to be generated. One or more text portions can be selected for a training image. Each text portion can include one or more words selected from the language text corpus accessed in 1002 and, in some instances, punctuations and white spaces.

For example, in a corpus of documents comprising Greek text, a series of letters, punctuations, etc., can be selected to be included as text lines in the training image to be generated.

In some instances, the number of text portions to be included in a training image may be randomly selected by the TDGS, and the text content for each text portion may also be selected randomly from the text corpus by the TDGS. In some other embodiments, rules may be configured for the TDGS that impact the selected of the number of text portions and the contents of those text portions.

At 1006, the processing in 1008 and 1010 is performed for each text portion selected in 1004. For example, in certain implementations, each text portion selected in 1004 a line of text, where the text content of the line is selected from the text corpus.

At 1008, the TDGS selects a font and a font size to be used for the text portion. The TDGS may select from different fonts and font sizes. The font and font size selection can be done randomly by the TDGS or may be driven by some font and font size selection rules configured for the TDGS. A single training image could contain text content in one or more fonts in one or more font sizes. In certain embodiments, a format (e.g., a letter, a form, a web page, etc.) for the training image to be generated may be specified or selected by the TDGS and the selection of the font and font sizes may be driven by the selected or specified format.

At 1010, the TDGS determines a location within the training image where the text portion is to be placed in the training image to be generated. For example, for a text portion corresponding to a line of text, the TDGS may determine where, i.e., the position or location, within the training image the particular line is to be placed. In certain embodiments, each text portion (e.g., a text line) may be represented by a bounding box bounding the text content of the text portion. The TDGS may then assign a position in the training image to be generated (e.g., providing coordinates for the bounding box within the training image to be generated) for the bounding box.

As indicated above, the processing in 1008 and 1010 is repeated for each text portion to be placed in a training image to be generated. A training image to be generated can include one text portion or multiple text portions.

At 1012, the TDGS generates a training image that contains all of the text portions selected in 1004, and in the generated training image, each text portion is in the font and the font size selected for the text portion in 1008 and is placed in the training image in the location determined for the text portion in 1010. An example of a training image can be shown in FIG. 3A, for example.

In some instances, optionally, at 1014, a set of one or more transformed training images may be generated by the TDGS based upon a training image generated by the TDGS in 1012. In certain instances, a training image generated in 1012 may be used to generate a corresponding transformed training image. In some other instances, a training image generated in 1012 may be used to generate multiple corresponding transformed training images.

The TDGS may generate a transformed training image by applying one or more transforms to a training image generated in 1012. Different transformed images may be generated by applying different transformations. Example of transformations are depicted in FIG. 7 and its associated description. An example of processing that may be performed for generating a transformed training image is also depicted FIG. 9 and described above.

At 1016, the TDGS generates label data for each training image generated in 1010 and for each transformed training image generated in 1014. The label data can include, for each text portion in the training image, one or more labels indicative of a position of the text portion within the training image (training image generated in 1012 or a transformed training image generated in 1014) and the text content of the text portion. For example, in the example as shown in FIG. 3B, label data can be generated showing ground truth content data and bounding box data for each text line.

At 1018, the training image generated in 1012 and its associated label data generated in 1016, and the one or more transformed training images generated in 1014 and their associated label data generated in 1016 are added to the training data that is generated by the TDGS in response to the request received in 1001. The training data comprises a set of training images and their corresponding label data. The set of training images in the training data include training images generated in 1012 and any transformed training images generated in 1014. In certain implementations, instead of a training image generated in 1012, the one or more transformed training images generated from the training image and the label data associated with the one or more transformed training images is included in the training data.

At 1020, the training data generated by the TDGS is output to a consumer of the data and/or stored for future use. For example, the generated training data may be provided to a source of the request received in 1001. In certain instances, the training data that is generated may be provided to a model training system, which may use the generated training data or a portion thereof to train one or more machine learning models (e.g., a neural network). In other instances, the generated training data may be stored in non-volatile memory for later use, which may involve training a language machine learning model.

As described above, a training image in the set of training images can include text line(s) being disposed with a background image. The background image can obfuscate the text in the training image, increasing difficulty in identifying the text and increasing the accuracy in identifying the text in training the model. FIG. 11 is a flow process 1100 for generating a training image including a text portion and a background image according to certain embodiments.

At 1101, a request can be received to generate a training image and associated label data. The training image can contain text content in a requested language overlaid on a background image.

At 1102, processing can be performed as described in 1002, 1004, 1006, 1008, 1010 in FIG. 10. At 1104, from an input corpus of images, the TDGS can select an image to be used as a background for a training image to be generated. For example, an image can be selected from the image corpus providing a series of images to be used in a training image.

At 1106, the TDGS can generate an image using the text portions selected in 1004 on a background of the image selected in 1104. Each text portion in the image can be in the font selected for the text portion in 1008 and is located in the image in the location determined from the text portion in 1010.

In some instances, at 1108, a set of one or more transformed images can be generated based upon the image generated in 1106. The transformation of the images can be similar to that as described at 1014, for example.

At 1110, the TDGS can generate the label data for the image generated in 1106 and for each transformed image generated in 1108. The label data for each image can include, for each text portion in the image, a bounding box for the text portion and associated location information.

At 1112, the TDGS can add the image generated in 1106 and its associated label data generated in 1110 to a set of training images. In some instances, the one or more transformed training images generated in 1108 and their associated label data generated in 1110 can also be added to the set of training images.

As described above, a training image in the set of training images can include text line(s) comprising a handwritten text. The handwritten text can simulate user-written text for training a model.

For instance, for a text portion, a handwriting style can be selected. Example handwriting styles can include print, cursive, etc. In some instances, a series of previously generated handwriting fonts can be used as fonts to text (e.g., from a text corpus). A synthetic handwritten text portion can be generated using a handwriting generation technique. An example handwriting generation technique can incorporate deep learning or computer-vision techniques to uniquely create handwritten samples based on real training samples for a text portion.

FIG. 12 is a flow process 1200 for generating a training image including a text portion comprising a handwritten text font according to certain embodiments.

At 1201, a request can be received to generate a training image and associated label data. The training image can contain text content in a requested language with a handwritten text portion.

At 1202, processing can be performed as described in 1002, 1004, 1006, 1008, 1010 in FIG. 10.

At 1204, the TDGS can perform a process to identify text lines to be added in a set of training images for each text portion. In some instances, a text portion can be associated with each training image. In other instances, a number of text portions can be added to a single training image.

At 1206, the TDGS can select a handwriting style (e.g., handwritten font) to be used for the text portion. This can be user-specified or selected using a noise vector, for example.

At 1208, The TDGS can generate a synthetic handwritten portion. The synthetic handwritten portion can be generated using a handwriting generation technique, such as using a generative adversarial network (e.g., GAN), for example.

At 1210, the TDGS can determine a location within the image to be generated where the handwritten text portion is to be placed. The location can be specified by a bounding box bounding the text portion. The position of the bounding box can be specified by a set of coordinates on the image.

At 1212, the TDGS can generate an image containing the handwritten text portions generated in 1208. Each handwritten text portion can be placed in the image using the location determined for the handwritten text portion in 1210.

In some instances, at 1214, a set of one or more transformed images can be generated based upon the image generated in 1212. Each transformed image can be generated by applying one or more transformations to the image generated in 1210. Different transformed images may be generated by applying different transformations. Example transformation processes are described in greater detail with respect to FIG. 7.

At 1216, label data can be generated for the image generated in 1210 and for each transformed image generated in 1214. The label data for each image can include, for each text portion in the image, a bounding box for the text portion and associated location information. The associated location information can include the location information determined for the text portion in 1210. The label data can also include, for each text portion bounding box in the image, the ground truth of the text contained in the bounding box.

At 1218, the image generated in 1212 and its associated label data generated in 1216 can be added to a set of training images. In some instances, the one or more transformed training images generated in 1214 and their associated label data generated in 1016 can also be added to the set of training images.

As described above, the present disclosure provides automated techniques for generating training data that can be used for training machine learning models that are being trained to process images. More particularly, techniques are described for automatically, and substantially without human intervention, generating training data where the training data includes a set of training images containing text content and associated label data.

For example, the techniques as described herein automatically generate both the training images and the associated label data. The label data that is automatically generated for a training image includes a label identifying locations of one or more text portions (e.g., demarcated by bounding boxes) within the training image, and for each text portion, a label indicative of the text content in the text portion. By automating both the generation of training images and the generation of associated label data, the techniques described herein are very scalable and repeatable and can be used to generate large amounts of training data, which in turn enables building more reliable and accurate language models. The automated techniques described herein can be used to generate training data for images containing English language text and also for other languages.

Further, a training dataset generation system (TDGS) is described that can automatically generate both the training images and the associated label data. The generated images and the accompanying generated label data may then be used as a training dataset for training machine learning models, especially language models. Since both the training images and the associated label data are generated automatically, and substantially free of any manual intervention, a large amount of training data can be generated efficiently in a very quick time. This dramatically, and by an order of several magnitudes, increases the amount of training data that is available for training various machine learning models, such as for models configured to make language-based predictions for images containing text content. This increase in available training data helps a data scientist develop and train better, more accurate, and more reliable language models without having to worry about the availability of training data. Further, the techniques described herein can be used to generate training data for multiple languages including for English and also for other non-English languages.

In certain embodiments, the automated training data generation functionality may be offered as a cloud service by a cloud services provider (CSP). This service can be subscribed to by one or more customers of the CSP. For example, a CSP providing IaaS services may provide the automated training data generation as a service. The following section describes an example IaaS infrastructure that may be used to provide the automated training data generation functionality described herein as a service.

Example IaaS System

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need (or, alternatively, be desired/expected) to be set up. In some instances, the provisioning can be done manually, a provisioning tool may be utilized to provision the resources, and/or deployment tools may be utilized to deploy the code once the infrastructure is provisioned.

Figure 13:
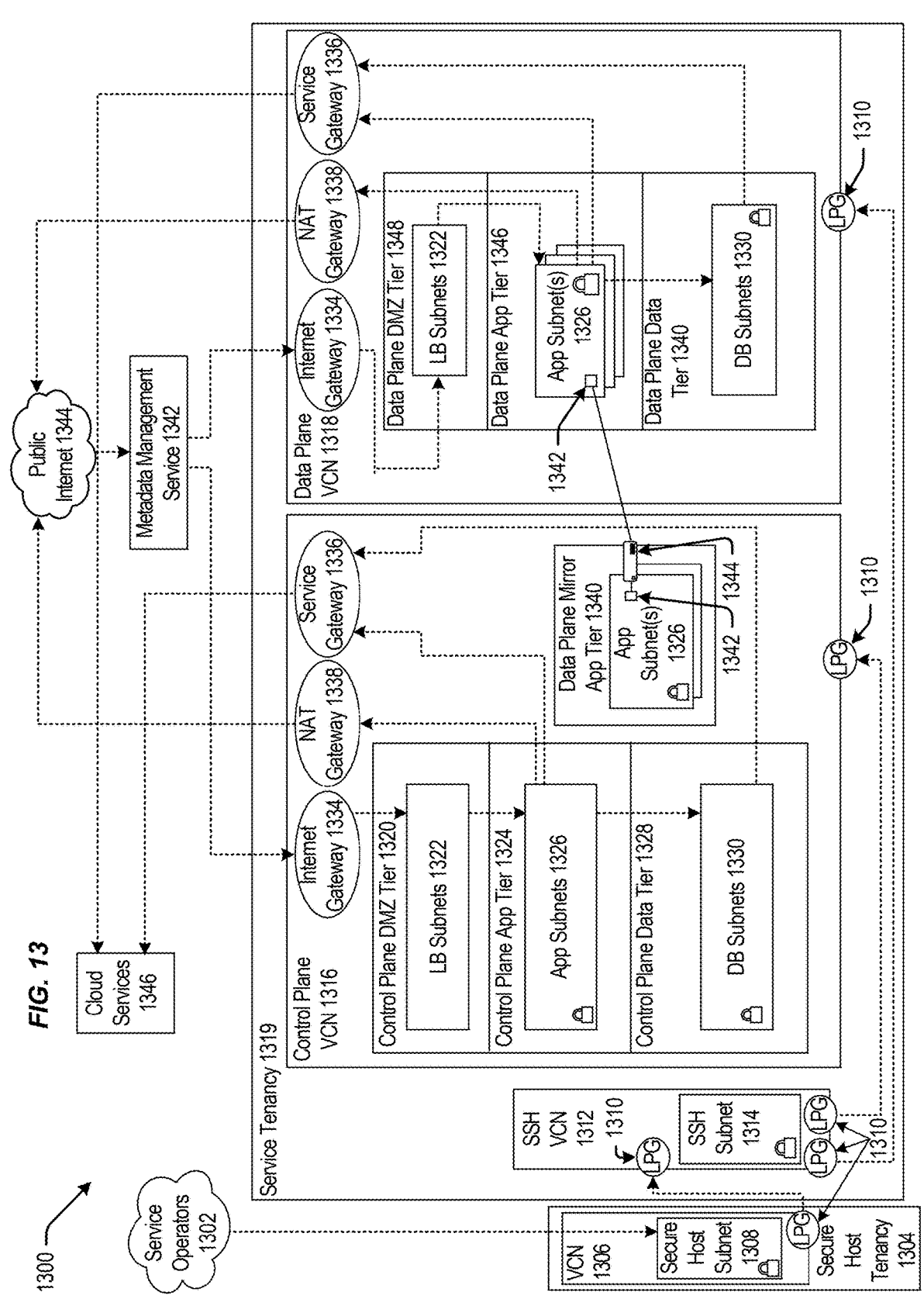
FIG. 13 is a block diagram illustrating one pattern for implementing a cloud infrastructure as a service system, according to at least one embodiment.

FIG. 13 is a block diagram 1300 illustrating an example pattern of an IaaS architecture, according to at least one embodiment. Service operators 1302 can be communicatively coupled to a secure host tenancy 1304 that can include a virtual cloud network (VCN) 1306 and a secure host subnet 1308. In some examples, the service operators 1302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 15, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1306 and/or the Internet.

The VCN 1306 can include a local peering gateway (LPG) 1310 that can be communicatively coupled to a secure shell (SSH) VCN 1312 via an LPG 1310 contained in the SSH VCN 1312. The SSH VCN 1312 can include an SSH subnet 1314, and the SSH VCN 1312 can be communicatively coupled to a control plane VCN 1316 via the LPG 1310 contained in the control plane VCN 1316. Also, the SSH VCN 1312 can be communicatively coupled to a data plane VCN 1318 via an LPG 1310. The control plane VCN 1316 and the data plane VCN 1318 can be contained in a service tenancy 1319 that can be owned and/or operated by the IaaS provider.

The control plane VCN 1316 can include a control plane demilitarized zone (DMZ) tier 1320 that acts as a perimeter network (e.g., portions of a corporate network between the corporate intranet and external networks). The DMZ-based servers may have restricted responsibilities and help keep breaches contained. Additionally, the DMZ tier 1320 can include one or more load balancer (LB) subnet(s) 1322, a control plane app tier 1324 that can include app subnet(s) 1326, a control plane data tier 1328 that can include database (DB) subnet(s) 1330 (e.g., frontend DB subnet(s) and/or backend DB subnet(s)). The LB subnet(s) 1322 contained in the control plane DMZ tier 1320 can be communicatively coupled to the app subnet(s) 1326 contained in the control plane app tier 1324 and an Internet gateway 1334 that can be contained in the control plane VCN 1316, and the app subnet(s) 1326 can be communicatively coupled to the DB subnet(s) 1330 contained in the control plane data tier 1328 and a service gateway 1336 and a network address translation (NAT) gateway 1338. The control plane VCN 1316 can include the service gateway 1336 and the NAT gateway 1338.

The control plane VCN 1316 can include a data plane mirror app tier 1340 that can include app subnet(s) 1326. The app subnet(s) 1326 contained in the data plane mirror app tier 1340 can include a virtual network interface controller (VNIC) 1342 that can execute a compute instance 1344. The compute instance 1344 can communicatively couple the app subnet(s) 1326 of the data plane mirror app tier 1340 to app subnet(s) 1326 that can be contained in a data plane app tier 1346.

The data plane VCN 1318 can include the data plane app tier 1346, a data plane DMZ tier 1348, and a data plane data tier 1350. The data plane DMZ tier 1348 can include LB subnet(s) 1322 that can be communicatively coupled to the app subnet(s) 1326 of the data plane app tier 1346 and the Internet gateway 1334 of the data plane VCN 1318. The app subnet(s) 1326 can be communicatively coupled to the service gateway 1336 of the data plane VCN 1318 and the NAT gateway 1338 of the data plane VCN 1318. The data plane data tier 1350 can also include the DB subnet(s) 1330 that can be communicatively coupled to the app subnet(s) 1326 of the data plane app tier 1346.

The Internet gateway 1334 of the control plane VCN 1316 and of the data plane VCN 1318 can be communicatively coupled to a metadata management service 1352 that can be communicatively coupled to public Internet 1354. Public Internet 1354 can be communicatively coupled to the NAT gateway 1338 of the control plane VCN 1316 and of the data plane VCN 1318. The service gateway 1336 of the control plane VCN 1316 and of the data plane VCN 1318 can be communicatively couple to cloud services 1356.

In some examples, the service gateway 1336 of the control plane VCN 1316 or of the data plane VCN 1318 can make application programming interface (API) calls to cloud services 1356 without going through public Internet 1354. The API calls to cloud services 1356 from the service gateway 1336 can be one-way: the service gateway 1336 can make API calls to cloud services 1356, and cloud services 1356 can send requested data to the service gateway 1336. But, cloud services 1356 may not initiate API calls to the service gateway 1336.

In some examples, the secure host tenancy 1304 can be directly connected to the service tenancy 1319, which may be otherwise isolated. The secure host subnet 1308 can communicate with the SSH subnet 1314 through an LPG 1310 that may enable two-way communication over an otherwise isolated system. Connecting the secure host subnet 1308 to the SSH subnet 1314 may give the secure host subnet 1308 access to other entities within the service tenancy 1319.

The control plane VCN 1316 may allow users of the service tenancy 1319 to set up or otherwise provision desired resources. Desired resources provisioned in the control plane VCN 1316 may be deployed or otherwise used in the data plane VCN 1318. In some examples, the control plane VCN 1316 can be isolated from the data plane VCN 1318, and the data plane mirror app tier 1340 of the control plane VCN 1316 can communicate with the data plane app tier 1346 of the data plane VCN 1318 via VNICs 1342 that can be contained in the data plane mirror app tier 1340 and the data plane app tier 1346.

In some examples, users of the system, or customers, can make requests, for example create, read, update, or delete (CRUD) operations, through public Internet 1354 that can communicate the requests to the metadata management service 1352. The metadata management service 1352 can communicate the request to the control plane VCN 1316 through the Internet gateway 1334. The request can be received by the LB subnet(s) 1322 contained in the control plane DMZ tier 1320. The LB subnet(s) 1322 may determine that the request is valid, and in response to this determination, the LB subnet(s) 1322 can transmit the request to app subnet(s) 1326 contained in the control plane app tier 1324. If the request is validated and requires a call to public Internet 1354, the call to public Internet 1354 may be transmitted to the NAT gateway 1338 that can make the call to public Internet 1354. Memory that may be desired to be stored by the request can be stored in the DB subnet(s) 1330.

In some examples, the data plane mirror app tier 1340 can facilitate direct communication between the control plane VCN 1316 and the data plane VCN 1318. For example, changes, updates, or other suitable modifications to configuration may be desired to be applied to the resources contained in the data plane VCN 1318. Via a VNIC 1342, the control plane VCN 1316 can directly communicate with, and can thereby execute the changes, updates, or other suitable modifications to configuration to, resources contained in the data plane VCN 1318.

In some embodiments, the control plane VCN 1316 and the data plane VCN 1318 can be contained in the service tenancy 1319. In this case, the user, or the customer, of the system may not own or operate either the control plane VCN 1316 or the data plane VCN 1318. Instead, the IaaS provider may own or operate the control plane VCN 1316 and the data plane VCN 1318, both of which may be contained in the service tenancy 1319. This embodiment can enable isolation of networks that may prevent users or customers from interacting with other users', or other customers', resources. Also, this embodiment may allow users or customers of the system to store databases privately without needing to rely on public Internet 1354, which may not have a desired level of threat prevention, for storage.

In other embodiments, the LB subnet(s) 1322 contained in the control plane VCN 1316 can be configured to receive a signal from the service gateway 1336. In this embodiment, the control plane VCN 1316 and the data plane VCN 1318 may be configured to be called by a customer of the IaaS provider without calling public Internet 1354. Customers of the IaaS provider may desire this embodiment since database(s) that the customers use may be controlled by the IaaS provider and may be stored on the service tenancy 1319, which may be isolated from public Internet 1354.

Figure 14:
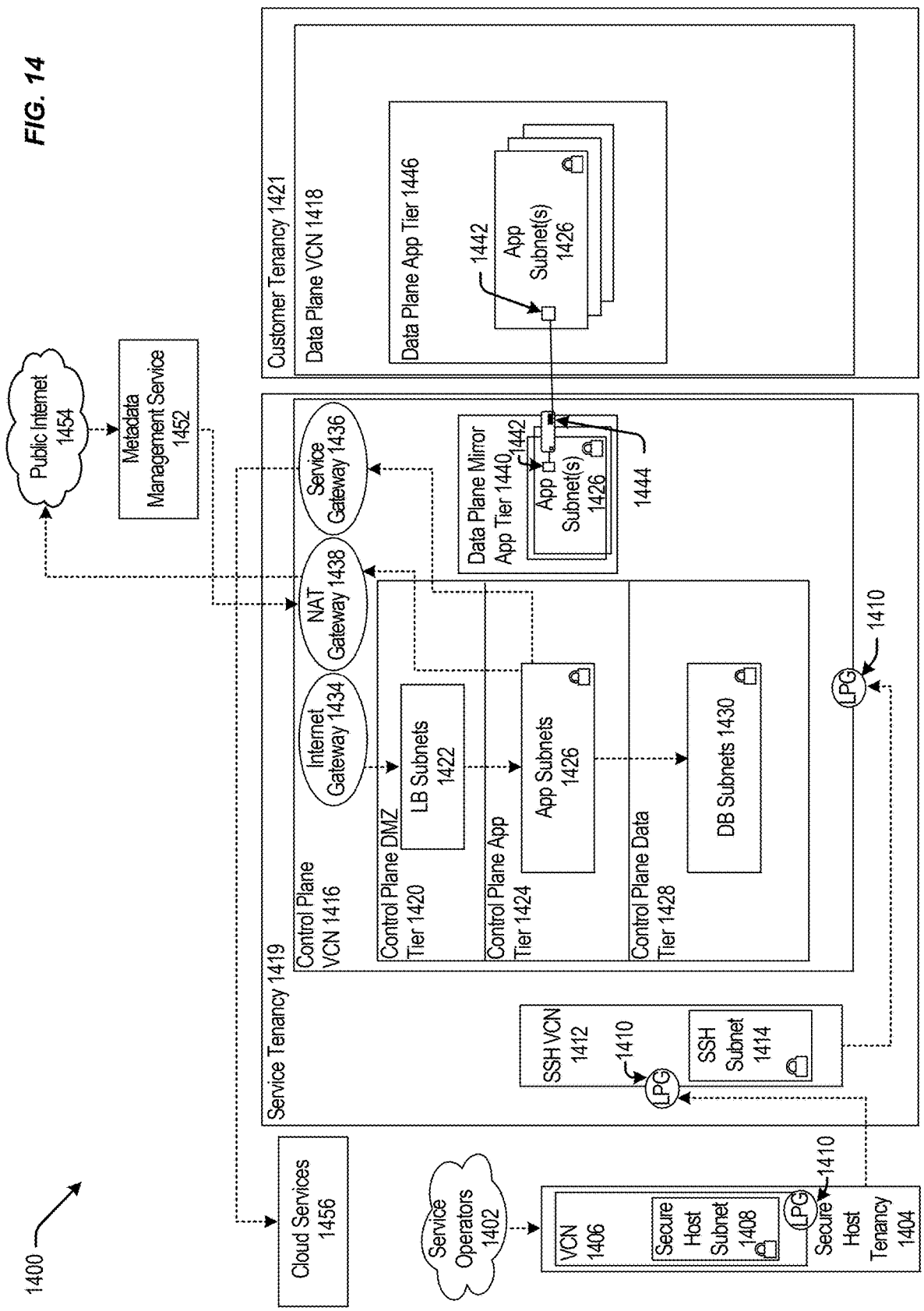
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1302 of FIG. 13) can be communicatively coupled to a secure host tenancy 1404 (e.g. the secure host tenancy 1304 of FIG. 13) that can include a virtual cloud network (VCN) 1406 (e.g. the VCN 1306 of FIG. 13) and a secure host subnet 1408 (e.g. the secure host subnet 1308 of FIG. 13). The VCN 1406 can include a local peering gateway (LPG) 1410 (e.g. the LPG 1310 of FIG. 13) that can be communicatively coupled to a secure shell (SSH) VCN 1412 (e.g. the SSH VCN 1312 of FIG. 13) via an LPG 1310 contained in the SSH VCN 1412. The SSH VCN 1412 can include an SSH subnet 1414 (e.g. the SSH subnet 1314 of FIG. 13), and the SSH VCN 1412 can be communicatively coupled to a control plane VCN 1416 (e.g. the control plane VCN 1316 of FIG. 13) via an LPG 1410 contained in the control plane VCN 1416. The control plane VCN 1416 can be contained in a service tenancy 1419 (e.g. the service tenancy 1319 of FIG. 13), and the data plane VCN 1418 (e.g. the data plane VCN 1318 of FIG. 13) can be contained in a customer tenancy 1421 that may be owned or operated by users, or customers, of the system.

The control plane VCN 1416 can include a control plane DMZ tier 1420 (e.g. the control plane DMZ tier 1320 of FIG. 13) that can include LB subnet(s) 1422 (e.g. LB subnet(s) 1322 of FIG. 13), a control plane app tier 1424 (e.g. the control plane app tier 1324 of FIG. 13) that can include app subnet(s) 1426 (e.g. app subnet(s) 1326 of FIG. 13), a control plane data tier 1428 (e.g. the control plane data tier 1328 of FIG. 13) that can include database (DB) subnet(s) 1430 (e.g. similar to DB subnet(s) 1330 of FIG. 13). The LB subnet(s) 1422 contained in the control plane DMZ tier 1420 can be communicatively coupled to the app subnet(s) 1426 contained in the control plane app tier 1424 and an Internet gateway 1434 (e.g. the Internet gateway 1334 of FIG. 13) that can be contained in the control plane VCN 1416, and the app subnet(s) 1426 can be communicatively coupled to the DB subnet(s) 1430 contained in the control plane data tier 1428 and a service gateway 1436 (e.g. the service gateway of FIG. 13) and a network address translation (NAT) gateway 1438 (e.g. the NAT gateway 1338 of FIG. 13). The control plane VCN 1416 can include the service gateway 1436 and the NAT gateway 1438.

The control plane VCN 1416 can include a data plane mirror app tier 1440 (e.g. the data plane mirror app tier 1340 of FIG. 13) that can include app subnet(s) 1426. The app subnet(s) 1426 contained in the data plane mirror app tier 1440 can include a virtual network interface controller (VNIC) 1442 (e.g. the VNIC of 1342) that can execute a compute instance 1444 (e.g. similar to the compute instance 1344 of FIG. 13). The compute instance 1444 can facilitate communication between the app subnet(s) 1426 of the data plane mirror app tier 1440 and the app subnet(s) 1426 that can be contained in a data plane app tier 1446 (e.g. the data plane app tier 1346 of FIG. 13) via the VNIC 1442 contained in the data plane mirror app tier 1440 and the VNIC 1442 contained in the data plane app tier 1446.

The Internet gateway 1434 contained in the control plane VCN 1416 can be communicatively coupled to a metadata management service 1452 (e.g. the metadata management service 1352 of FIG. 13) that can be communicatively coupled to public Internet 1454 (e.g. public Internet 1354 of FIG. 13). Public Internet 1454 can be communicatively coupled to the NAT gateway 1438 contained in the control plane VCN 1416. The service gateway 1436 contained in the control plane VCN 1416 can be communicatively couple to cloud services 1456 (e.g. cloud services 1356 of FIG. 13).

In some examples, the data plane VCN 1418 can be contained in the customer tenancy 1421. In this case, the IaaS provider may provide the control plane VCN 1416 for each customer, and the IaaS provider may, for each customer, set up a unique compute instance 1444 that is contained in the service tenancy 1419. Each compute instance 1444 may allow communication between the control plane VCN 1416, contained in the service tenancy 1419, and the data plane VCN 1418 that is contained in the customer tenancy 1421. The compute instance 1444 may allow resources, that are provisioned in the control plane VCN 1416 that is contained in the service tenancy 1419, to be deployed or otherwise used in the data plane VCN 1418 that is contained in the customer tenancy 1421.

In other examples, the customer of the IaaS provider may have databases that live in the customer tenancy 1421. In this example, the control plane VCN 1416 can include the data plane mirror app tier 1440 that can include app subnet(s) 1426. The data plane mirror app tier 1440 can reside in the data plane VCN 1418, but the data plane mirror app tier 1440 may not live in the data plane VCN 1418. That is, the data plane mirror app tier 1440 may have access to the customer tenancy 1421, but the data plane mirror app tier 1440 may not exist in the data plane VCN 1418 or be owned or operated by the customer of the IaaS provider. The data plane mirror app tier 1440 may be configured to make calls to the data plane VCN 1418 but may not be configured to make calls to any entity contained in the control plane VCN 1416. The customer may desire to deploy or otherwise use resources in the data plane VCN 1418 that are provisioned in the control plane VCN 1416, and the data plane mirror app tier 1440 can facilitate the desired deployment, or other usage of resources, of the customer.

In some embodiments, the customer of the IaaS provider can apply filters to the data plane VCN 1418. In this embodiment, the customer can determine what the data plane VCN 1418 can access, and the customer may restrict access to public Internet 1454 from the data plane VCN 1418. The IaaS provider may not be able to apply filters or otherwise control access of the data plane VCN 1418 to any outside networks or databases. Applying filters and controls by the customer onto the data plane VCN 1418, contained in the customer tenancy 1421, can help isolate the data plane VCN 1418 from other customers and from public Internet 1454.

In some embodiments, cloud services 1456 can be called by the service gateway 1436 to access services that may not exist on public Internet 1454, on the control plane VCN 1416, or on the data plane VCN 1418. The connection between cloud services 1456 and the control plane VCN 1416 or the data plane VCN 1418 may not be live or continuous. Cloud services 1456 may exist on a different network owned or operated by the IaaS provider. Cloud services 1456 may be configured to receive calls from the service gateway 1436 and may be configured to not receive calls from public Internet 1454. Some cloud services 1456 may be isolated from other cloud services 1456, and the control plane VCN 1416 may be isolated from cloud services 1456 that may not be in the same region as the control plane VCN 1416. For example, the control plane VCN 1416 may be located in "Region 1," and cloud service "Deployment 13," may be located in Region 1 and in "Region 2." If a call to Deployment 13 is made by the service gateway 1436 contained in the control plane VCN 1416 located in Region 1, the call may be transmitted to Deployment 13 in Region 1. In this example, the control plane VCN 1416, or Deployment 13 in Region 1, may not be communicatively coupled to, or otherwise in communication with, Deployment 13 in Region 2.

Figure 15:
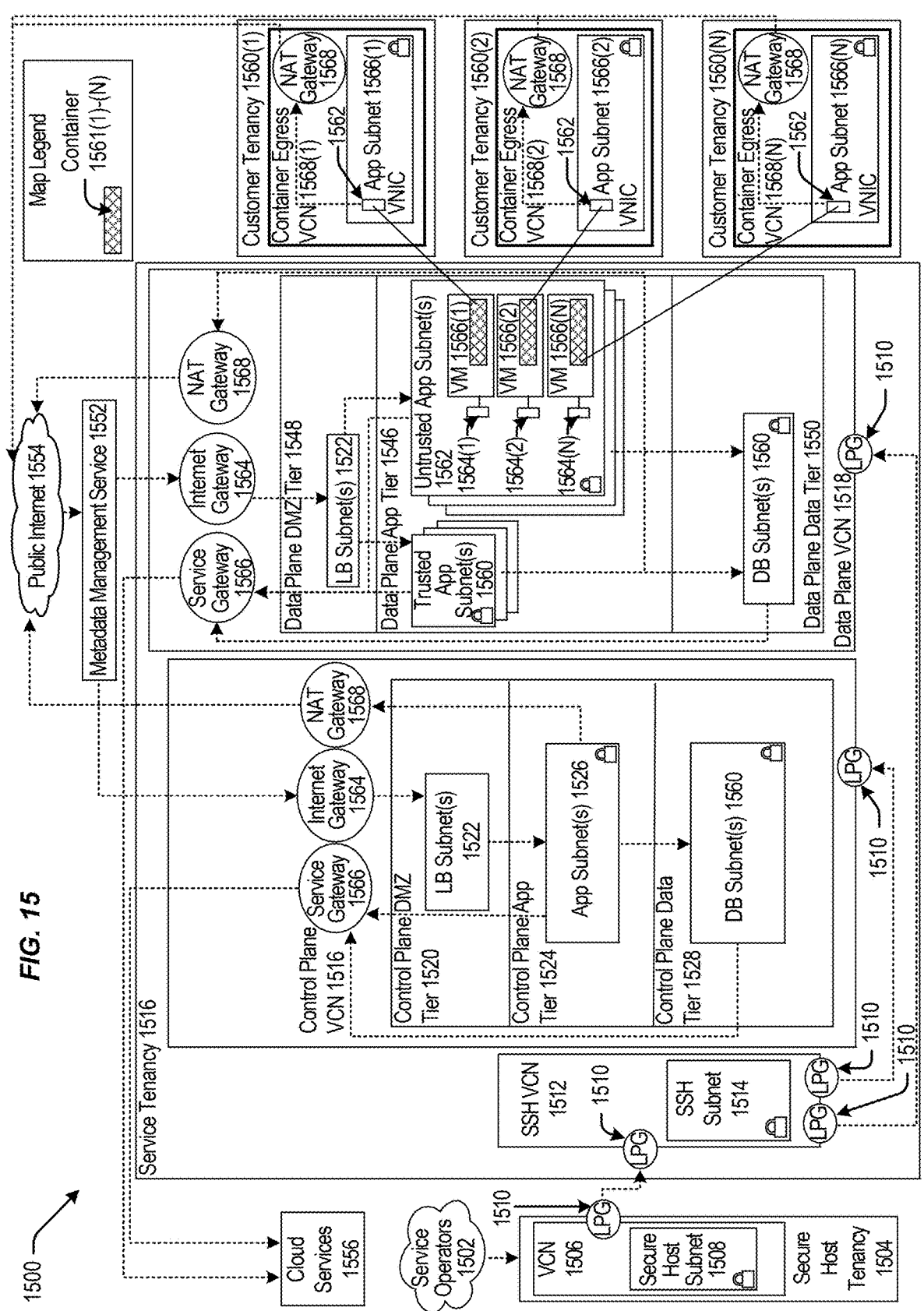
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g. service operators 1302 of FIG. 13) can be communicatively coupled to a secure host tenancy 1504 (e.g. the secure host tenancy 1304 of FIG. 13) that can include a virtual cloud network (VCN) 1506 (e.g. the VCN 1306 of FIG. 13) and a secure host subnet 1508 (e.g. the secure host subnet 1308 of FIG. 13). The VCN 1506 can include an LPG 1510 (e.g. the LPG 1310 of FIG. 13) that can be communicatively coupled to an SSH VCN 1512 (e.g. the SSH VCN 1312 of FIG. 13) via an LPG 1510 contained in the SSH VCN 1512. The SSH VCN 1512 can include an SSH subnet 1514 (e.g. the SSH subnet 1314 of FIG. 13), and the SSH VCN 1512 can be communicatively coupled to a control plane VCN 1516 (e.g. the control plane VCN 1316 of FIG. 13) via an LPG 1510 contained in the control plane VCN 1516 and to a data plane VCN 1518

(e.g. the data plane 1318 of FIG. 13) via an LPG 1510 contained in the data plane VCN 1518. The control plane VCN 1516 and the data plane VCN 1518 can be contained in a service tenancy 1519 (e.g. the service tenancy 1319 of FIG. 13).

The control plane VCN 1516 can include a control plane DMZ tier 1520 (e.g. the control plane DMZ tier 1320 of FIG. 13) that can include load balancer (LB) subnet(s) 1522 (e.g. LB subnet(s) 1322 of FIG. 13), a control plane app tier 1524 (e.g. the control plane app tier 1324 of FIG. 13) that can include app subnet(s) 1526 (e.g. similar to app subnet(s) 1326 of FIG. 13), a control plane data tier 1528 (e.g. the control plane data tier 1328 of FIG. 13) that can include DB subnet(s) 1530. The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1334 of FIG. 13) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 13) and a network address translation (NAT) gateway 1538 (e.g. the NAT gateway 1338 of FIG. 13). The control plane VCN 1516 can include the service gateway 1536 and the NAT gateway 1538.

The data plane VCN 1518 can include a data plane app tier 1546 (e.g. the data plane app tier 1346 of FIG. 13), a data plane DMZ tier 1548 (e.g. the data plane DMZ tier 1348 of FIG. 13), and a data plane data tier 1550 (e.g. the data plane data tier 1350 of FIG. 13). The data plane DMZ tier 1548 can include LB subnet(s) 1522 that can be communicatively coupled to trusted app subnet(s) 1560 and untrusted app subnet(s) 1562 of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include one or more primary VNICs 1564(1)-(N) that can be communicatively coupled to tenant virtual machines (VMs) 1566(1)-(N). Each tenant VM 1566(1)-(N) can be communicatively coupled to a respective app subnet 1567(1)-(N) that can be contained in respective container egress VCNs 1568(1)-(N) that can be contained in respective customer tenancies 1570(1)-(N). Respective secondary VNICs 1572(1)-(N) can facilitate communication between the untrusted app subnet(s) 1562 contained in the data plane VCN 1518 and the app subnet contained in the container egress VCNs 1568(1)-(N). Each container egress VCNs 1568(1)-(N) can include a NAT gateway 1538 that can be communicatively coupled to public Internet 1554 (e.g. public Internet 1354 of FIG. 13).

The Internet gateway 1534 contained in the control plane VCN 1516 and contained in the data plane VCN 1518 can be communicatively coupled to a metadata management service 1552 (e.g. the metadata management system 1352 of FIG. 13) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some embodiments, the data plane VCN 1518 can be integrated with customer tenancies 1570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1546. Code to run the function may be executed in the VMs 1566(1)-(N), and the code may not be configured to run anywhere else on the data plane VCN 1518. Each VM 1566(1)-(N) may be connected to one customer tenancy 1570. Respective containers 1571(1)-(N) contained in the VMs 1566(1)-(N) may be configured to run the code. In this case, there can be a dual isolation (e.g., the containers 1571(1)-(N) running code, where the containers 1571(1)-(N) may be contained in at least the VM 1566(1)-(N) that are contained in the untrusted app subnet(s) 1562, which may help prevent incorrect or otherwise undesirable code from damaging the network of the IaaS provider or from damaging a network of a different customer. The containers 1571(1)-(N) may be communicatively coupled to the customer tenancy 1570 and may be configured to transmit or receive data from the customer tenancy 1570. The containers 1571(1)-(N) may not be configured to transmit or receive data from any other entity in the data plane VCN 1518. Upon completion of running the code, the IaaS provider may kill or otherwise dispose of the containers 1571(1)-(N).

In some embodiments, the trusted app subnet(s) 1560 may run code that may be owned or operated by the IaaS provider. In this embodiment, the trusted app subnet(s) 1560 may be communicatively coupled to the DB subnet(s) 1530 and be configured to execute CRUD operations in the DB subnet(s) 1530. The untrusted app subnet(s) 1562 may be communicatively coupled to the DB subnet(s) 1530, but in this embodiment, the untrusted app subnet(s) may be configured to execute read operations in the DB subnet(s) 1530. The containers 1571(1)-(N) that can be contained in the VM 1566(1)-(N) of each customer and that may run code from the customer may not be communicatively coupled with the DB subnet(s) 1530.

In other embodiments, the control plane VCN 1516 and the data plane VCN 1518 may not be directly communicatively coupled. In this embodiment, there may be no direct communication between the control plane VCN 1516 and the data plane VCN 1518. However, communication can occur indirectly through at least one method. An LPG 1510 may be established by the IaaS provider that can facilitate communication between the control plane VCN 1516 and the data plane VCN 1518. In another example, the control plane VCN 1516 or the data plane VCN 1518 can make a call to cloud services 1556 via the service gateway 1536. For example, a call to cloud services 1556 from the control plane VCN 1516 can include a request for a service that can communicate with the data plane VCN 1518.

Figure 16:
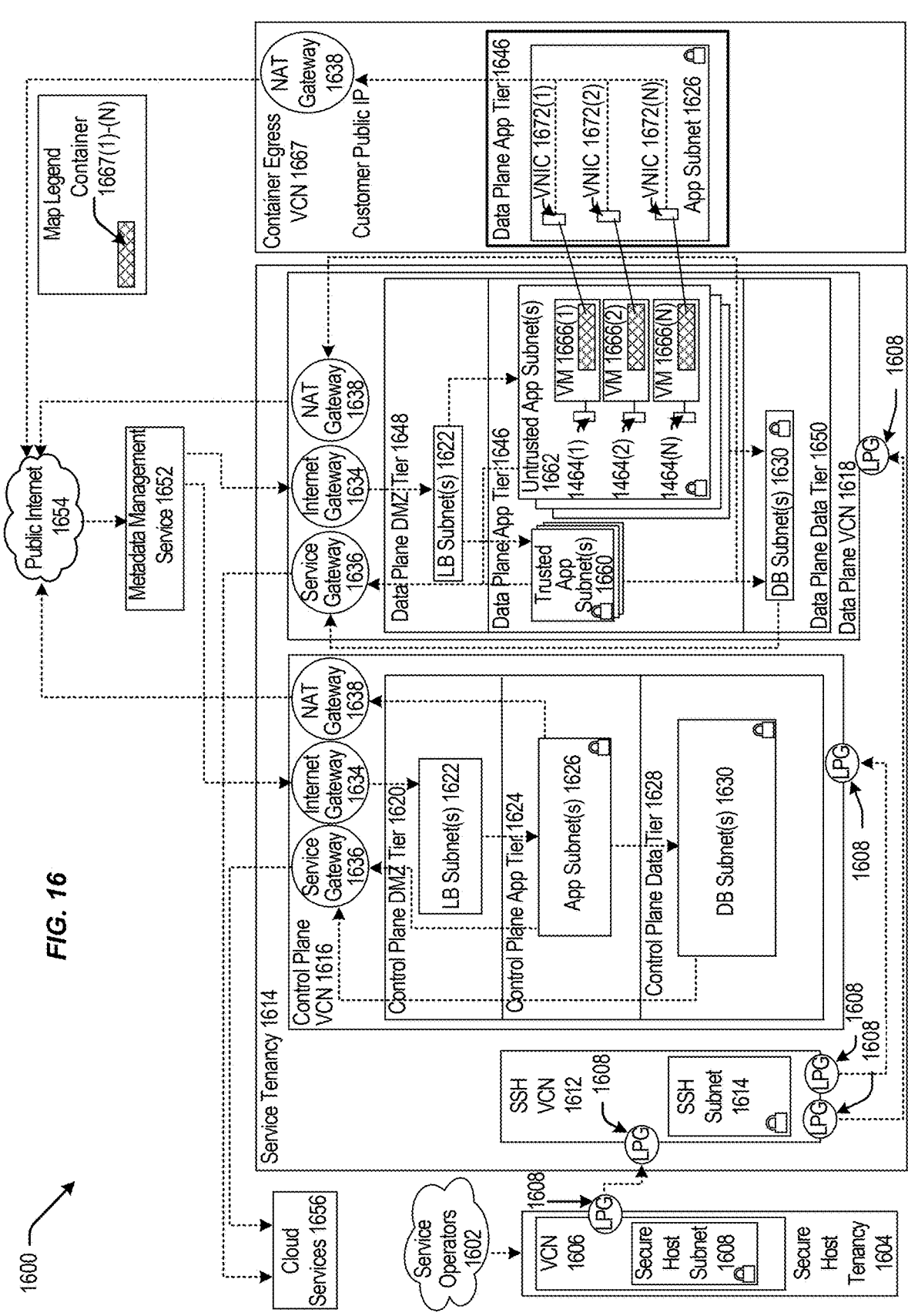
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g. service operators 1302 of FIG. 13) can be communicatively coupled to a secure host tenancy 1604 (e.g. the secure host tenancy 1304 of FIG. 13) that can include a virtual cloud network (VCN) 1606 (e.g. the VCN 1306 of FIG. 13) and a secure host subnet 1608 (e.g. the secure host subnet 1308 of FIG. 13). The VCN 1606 can include an LPG 1610 (e.g. the LPG 1310 of FIG. 13) that can be communicatively coupled to an SSH VCN 1612 (e.g. the SSH VCN 1312 of FIG. 13) via an LPG 1610 contained in the SSH VCN 1612. The SSH VCN 1612 can include an SSH subnet 1614 (e.g. the SSH subnet 1314 of FIG. 13), and the SSH VCN 1612 can be communicatively coupled to a control plane VCN 1616 (e.g. the control plane VCN 1316 of FIG. 13) via an LPG 1610 contained in the control plane VCN 1616 and to a data plane VCN 1618 (e.g. the data plane 1318 of FIG. 13) via an LPG 1610 contained in the data plane VCN 1618. The control plane VCN 1616 and the data plane VCN 1618 can be contained in a service tenancy 1619 (e.g. the service tenancy 1319 of FIG. 13).

The control plane VCN 1616 can include a control plane DMZ tier 1620 (e.g. the control plane DMZ tier 1320 of FIG. 13) that can include LB subnet(s) 1622 (e.g. LB subnet(s) 1322 of FIG. 13), a control plane app tier 1624 (e.g. the control plane app tier 1324 of FIG. 13) that can include app subnet(s) 1626 (e.g. app subnet(s) 1326 of FIG. 13), a control plane data tier 1628 (e.g. the control plane data tier 1328 of FIG. 13) that can include DB subnet(s) 1630 (e.g. DB subnet(s) 1530 of FIG. 15). The LB subnet(s) 1622 contained in the control plane DMZ tier 1620 can be communicatively coupled to the app subnet(s) 1626 contained in the control plane app tier 1624 and to an Internet gateway 1634 (e.g. the Internet gateway 1334 of FIG. 13) that can be contained in the control plane VCN 1616, and the app subnet(s) 1626 can be communicatively coupled to the DB subnet(s) 1630 contained in the control plane data tier 1628 and to a service gateway 1636 (e.g. the service gateway of FIG. 13) and a network address translation (NAT) gateway 1638 (e.g. the NAT gateway 1338 of FIG. 13). The control plane VCN 1616 can include the service gateway 1636 and the NAT gateway 1638.

The data plane VCN 1618 can include a data plane app tier 1646 (e.g. the data plane app tier 1346 of FIG. 13), a data plane DMZ tier 1648 (e.g. the data plane DMZ tier 1348 of FIG. 13), and a data plane data tier 1650 (e.g. the data plane data tier 1350 of FIG. 13). The data plane DMZ tier 1648 can include LB subnet(s) 1622 that can be communicatively coupled to trusted app subnet(s) 1660 (e.g. trusted app subnet(s) 1560 of FIG. 15) and untrusted app subnet(s) 1662 (e.g. untrusted app subnet(s) 1562 of FIG. 15) of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include primary VNICs 1664(1)-(N) that can be communicatively coupled to tenant virtual machines (VMs) 1666(1)-(N) residing within the untrusted app subnet(s) 1662. Each tenant VM 1666(1)-(N) can run code in a respective container 1667(1)-(N), and be communicatively coupled to an app subnet 1626 that can be contained in a data plane app tier 1646 that can be contained in a container egress VCN 1668. Respective secondary VNICs 1672(1)-(N) can facilitate communication between the untrusted app subnet(s) 1662 contained in the data plane VCN 1618 and the app subnet contained in the container egress VCN 1668. The container egress VCN can include a NAT gateway 1638 that can be communicatively coupled to public Internet 1654 (e.g. public Internet 1354 of FIG. 13).

The Internet gateway 1634 contained in the control plane VCN 1616 and contained in the data plane VCN 1618 can be communicatively coupled to a metadata management service 1652 (e.g. the metadata management system 1352 of FIG. 13) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some examples, the pattern illustrated by the architecture of block diagram 1600 of FIG. 16 may be considered an exception to the pattern illustrated by the architecture of block diagram 1500 of FIG. 15 and may be desirable for a customer of the IaaS provider if the IaaS provider cannot directly communicate with the customer (e.g., a disconnected region). The respective containers 1667(1)-(N) that are contained in the VMs 1666(1)-(N) for each customer can be accessed in real-time by the customer. The containers 1667(1)-(N) may be configured to make calls to respective secondary VNICs 1672(1)-(N) contained in app subnet(s) 1626 of the data plane app tier 1646 that can be contained in the container egress VCN 1668. The secondary VNICs 1672(1)-(N) can transmit the calls to the NAT gateway 1638 that may transmit the calls to public Internet 1654. In this example, the containers 1667(1)-(N) that can be accessed in real-time by the customer can be isolated from the control plane VCN 1616 and can be isolated from other entities contained in the data plane VCN 1618. The containers 1667(1)-(N) may also be isolated from resources from other customers.

In other examples, the customer can use the containers 1667(1)-(N) to call cloud services 1656. In this example, the customer may run code in the containers 1667(1)-(N) that requests a service from cloud services 1656. The containers 1667(1)-(N) can transmit this request to the secondary VNICs 1672(1)-(N) that can transmit the request to the NAT gateway that can transmit the request to public Internet 1654. Public Internet 1654 can transmit the request to LB subnet(s) 1622 contained in the control plane VCN 1616 via the Internet gateway 1634. In response to determining the request is valid, the LB subnet(s) can transmit the request to app subnet(s) 1626 that can transmit the request to cloud services 1656 via the service gateway 1636.

It should be appreciated that IaaS architectures 1300, 1400, 1500, 1600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 17:
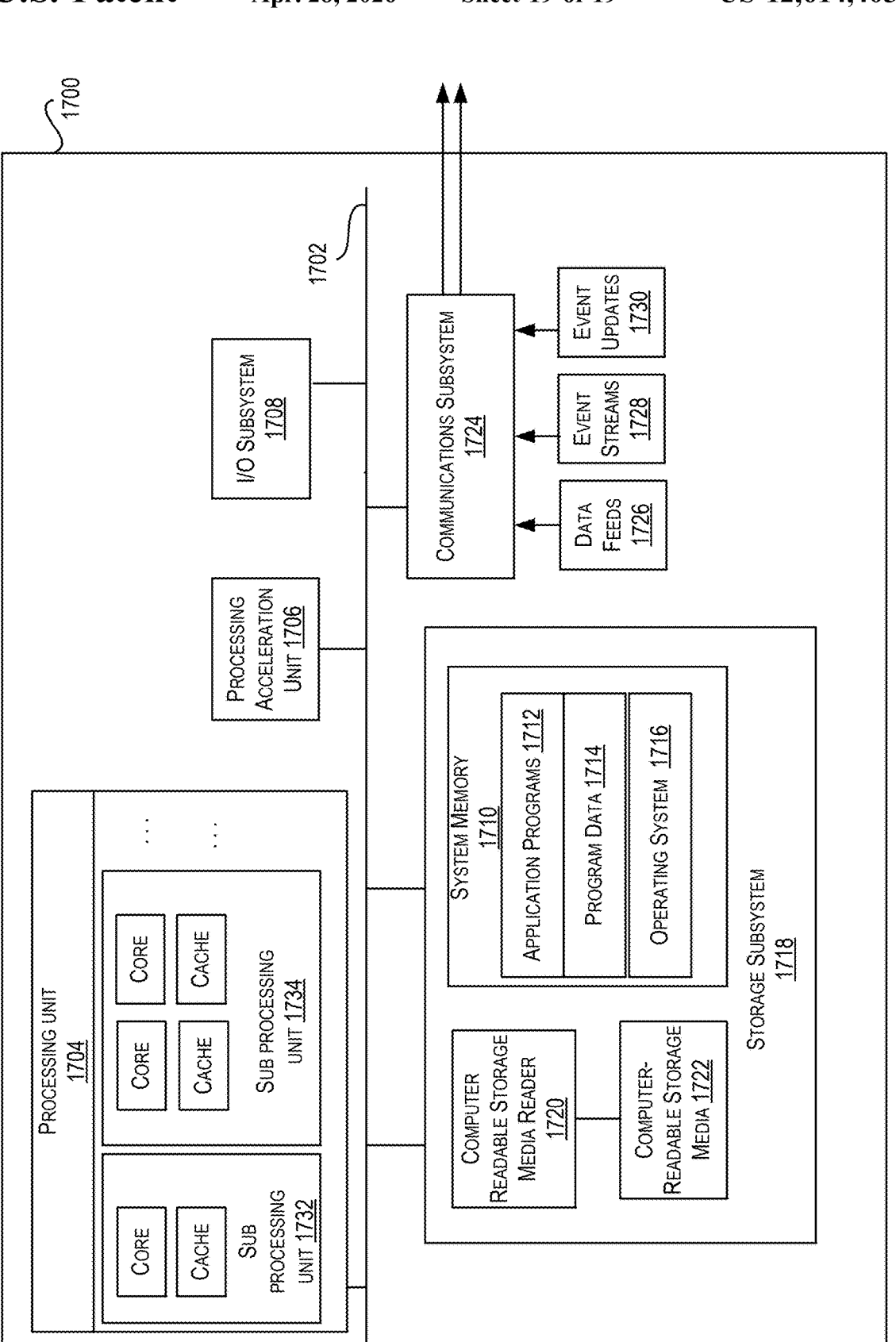
FIG. 17 is a block diagram illustrating an example computer system, according to at least one embodiment.

FIG. 17 illustrates an example computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that comprises software elements, shown as being currently located within a system memory 1710. System memory 1710 may store program instructions that are loadable and executable on processing unit 1704, as well as data generated during the execution of these programs.

Depending on the configuration and type of computer system 1700, system memory 1710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1704. In some implementations, system memory 1710 may include multiple different types of memory, such as static random access memory (SRAM) or dynamic random access memory (DRAM). In some implementations, a basic input/output system (BIOS), containing the basic routines that help to transfer information between elements within computer system 1700, such as during start-up, may typically be stored in the ROM. By way of example, and not limitation, system memory 1710 also illustrates application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 17 OS, and Palm® OS operating systems.

Storage subsystem 1718 may also provide a tangible computer-readable storage medium for storing the basic programming and data constructs that provide the functionality of some embodiments. Software (programs, code modules, instructions) that when executed by a processor provide the functionality described above may be stored in storage subsystem 1718. These software modules or instructions may be executed by processing unit 1704. Storage subsystem 1718 may also provide a repository for storing data used in accordance with the present disclosure.

Storage subsystem 1700 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for temporarily and/or more permanently containing, storing, transmitting, and retrieving computer-readable information.

Computer-readable storage media 1722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1700.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1502.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A method comprising:
selecting, by one or more processors and from a text corpus comprising a plurality of text content, a set of one or more text portions for inclusion in a training image to be generated, each text portion corresponding to a text content selected from the text corpus;
for each text portion in the set of text portions for inclusion in the training image:
determining, by the one or more processors, a location within the training image where the text portion is to be placed;
generating, by the one or more processors, the training image comprising the set of text portions, wherein each text portion is placed in the training image in the location determined for that text portion;
generating, by the one or more processors, label data for the training image comprising the set of text portions from the text corpus, wherein for each text portion in the training image, the label data for the training image includes information indicative of the text content corresponding to the text portion and the label data includes the location of the text portion within the training image comprising the set of text portions from the text corpus; and
outputting training data comprising the generated training image and the label data generated for the training image, the training data usable for training a machine learning model.

2. The method of claim 1, further comprising:
selecting, by the one or more processors, a font and a font size to be used for the text portion, wherein each text portion in the set of text portions is in the font and font size selected for that text portion.

3. The method of claim 1, further comprising:
using the training data to train the machine learning model using a supervised training technique.

4. The method of claim 3, further comprising:
receiving, from the machine learning model, a set of output data comprising identified content for the training image in a training dataset; and
comparing the set of output data with the label data to derive an accuracy value in identifying content in the training dataset.

5. The method of claim 1, wherein the label data includes the text content in each selected text portion and bounding box information specifying the determined locations of each selected text portion in the training image.

6. The method of claim 1, further comprising:
selecting an image from a corpus of images, wherein generating the training image includes adding the selected image as a background in the training image on which the set of text portions are overlaid.

7. The method of claim 1, further comprising:
for a first text portion of the set of text portions:
selecting a handwriting style to be used for the first text portion; and
generating a synthetic handwritten text portion using a generative adversarial network handwriting generation technique; and
generating the training image that includes the generated synthetic handwritten text portion.

8. The method of claim 1, further comprising:
modifying the training image using an image transformation process to modify at least one characteristic of the training image.

9. The method of claim 8, wherein modifying the training image further comprises:
modifying the training image by executing each of a series of image transformation steps for the image transformation process.

10. The method of claim 9, wherein the series of image transformation steps include any of: adding a border to any text portion in the training image, adding a line below any text portions in the training image, rotating any text portions of the training image, modifying a contrast of the training image, randomly modifying an aspect ratio of the training image, lowering an image quality of a set of training images, adding noise to the training image, adding a gradient background image to the training image, and inverting colors of the training image.

11. A system comprising:
one or more processors; and
a non-transitory computer-readable medium storing instructions that, when executed by the one or more processors, cause the one or more processors to perform processing comprising:
selecting, from a text corpus comprising a plurality of text content, a set of one or more text portions for inclusion in a training image to be generated, each text portion corresponding to a text content selected from the text corpus;
for each text portion in the set of text portions for inclusion in the training image:
determining a location within the training image where the text portion is to be placed;
selecting, by the one or more processors, a font and a font size to be used for the text portion;
generating the training image comprising the set of text portions, wherein each text portion is placed in the training image in the location determined for that text portion, and wherein each text portion in the set of text portions is in the font and font size selected for that text portion;

generating label data for the training image comprising the set of text portions from the text corpus, wherein for each text portion in the training image, the label data for the training image includes information indicative of the text content corresponding to the text portion and the label data includes the location of the text portion within the training image comprising the set of text portions from the text corpus; and outputting training data comprising the generated training image and the label data generated for the training image, the training data usable for training a machine learning model.

12. The system of claim 11, wherein the instructions further cause the one or more processors to perform processing comprising:

receiving a set of output data comprising identified content for the training image in a training dataset; and comparing the set of output data with the label data to derive an accuracy value in identifying content in the training dataset.

13. The system of claim 11, wherein the instructions further cause the one or more processors to perform processing comprising:

selecting an image from a corpus of images, wherein generating the training image includes adding the selected image as a background in the training image on which the set of text portions are overlaid.

14. The system of claim 11, wherein the instructions further cause the one or more processors to perform processing comprising:

for a first text portion of the set of text portions:

selecting a handwriting style to be used for the first text portion; and generating a synthetic handwritten text portion using a generative adversarial network handwriting generation technique; and generating the training image that includes the generated synthetic handwritten text portion.

15. The system of claim 11, wherein the instructions further cause the one or more processors to perform processing comprising:

modifying the training image using an image transformation process to modify at least one characteristic of the training image; and modifying the training image by executing each of a series of image transformation steps for the image transformation process according to a weight assigned to each of the series of image transformation steps, each weight comprising a probability of performing each of the series of image transformation steps.

16. A method comprising:

selecting, by one or more processors and from a text corpus comprising a plurality of text content, a set of one or more text portions for inclusion in a training image to be generated, each text portion corresponding to a text content selected from the text corpus;

generating, by the one or more processors, the training image comprising the set of text portions for inclusion in the training image, wherein each text portion is placed in the training image according to a location determined for that text portion;

generating, by the one or more processors, label data for the training image comprising the set of text portions from the text corpus, wherein for each text portion in the training image, the label data for the training image includes information indicative of the text content corresponding to the text portion and the label data includes the location of the text portion within the training image comprising the set of text portions from the text corpus; and outputting training data comprising the generated training image and the label data generated for the training image, the training data usable for training a machine learning model.

17. The method of claim 16, further comprising:

using the training data to train the machine learning model using a supervised training technique.

18. The method of claim 16, further comprising:

selecting an image from a corpus of images, wherein generating the training image includes adding the selected image as a background in the training image on which the set of text portions are overlaid.

19. The method of claim 16, further comprising:

modifying the training image using an image transformation process to modify at least one characteristic of the training image.

20. The method according to claim 1, wherein the label data generated for the training image describes a type of the text content, wherein the type comprises one of only text content, text content and background image, handwritten content and text content, or handwritten content, text content and background image.

* * * * *